(12) United States Patent
Yazawa

(10) Patent No.: US 7,002,778 B2
(45) Date of Patent: Feb. 21, 2006

(54) MAGNETIC HEAD HAVING AN FE-NI-X LAYER

(75) Inventor: Hisayuki Yazawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 188 days.

(21) Appl. No.: 10/678,863

(22) Filed: Oct. 3, 2003

(65) Prior Publication Data
US 2004/0070876 A1 Apr. 15, 2004

(30) Foreign Application Priority Data
Oct. 15, 2002 (JP) ............................ 2002-300382

(51) Int. Cl.
*G11B 5/147* (2006.01)
(52) U.S. Cl. ................................... 360/126
(58) Field of Classification Search ..................... None
See application file for complete search history.

(56) References Cited

U.S. PATENT DOCUMENTS

| 6,118,628 | A | 9/2000 | Sano et al. | |
| 6,376,108 | B1 | 4/2002 | Otagiri et al. | |
| 6,538,845 | B1 | 3/2003 | Watanabe et al. | |
| 6,765,757 | B1 * | 7/2004 | Kawasaki et al. | .......... 360/126 |
| 6,801,392 | B1 * | 10/2004 | Kawasaki et al. | .......... 360/126 |
| 2002/0154443 | A1 * | 10/2002 | Kawasaki et al. | .......... 360/126 |

FOREIGN PATENT DOCUMENTS

| JP | 8-215212 | 8/1996 |
| JP | 9-63016 | 3/1997 |
| JP | 2000-235911 | 8/2000 |
| JP | 2001-76315 | 3/2001 |

* cited by examiner

*Primary Examiner*—Robert S. Tupper
(74) *Attorney, Agent, or Firm*—Brinks Hofer Gilson & Lione

(57) ABSTRACT

A magnetic head including a lower core layer and an upper core layer, a non-magnetic gap layer and a coil layer. The upper core layer is made of an FeNiX (X being an element of one of rhenium Re and molybdenum Mo). A concentration difference of the upper core layer between a concentration of iron by weight percent and a concentration of the element X by weight percent is set to be larger at a leading edge of the upper core layer than at a position of the upper core layer more backward than the leading edge. In this arrangement, the magnetic head is provided with improved overwrite characteristics and accommodates the use of high-frequency recording signals.

16 Claims, 13 Drawing Sheets

MAGNETIC HEAD HAVING AN FE-NI-X LAYER

This application claims the benefit of priority to Japanese Patent Application 2002-300382, filed on Oct. 15, 2002.

BACKGROUND OF THE INVENTION

1. Field of the Invention

The present invention relates to magnetic heads that record data by applying a magnetic field to a magnetic recording medium and, in particular, relates to a magnetic head that works with a high-frequency recording signal and accommodates the implementation a narrow recording-track design.

2. Description of the Related Art

FIG. 19 is a sectional view of a known magnetic head. The magnetic head is an inductive head that guides a magnetic field, generated by a coil layer to which a signal current is supplied, to an upper core layer and a lower core layer, and generates a leakage magnetic field from a non-magnetic gap layer provided between the upper core layer and the lower core layer.

In the magnetic head shown in FIG. 19, a Gd determining layer 11, made of a non-magnetic material, is disposed a lower core layer 10. A magnetic pole section 12 is provided from a face opposing a recording medium to the Gd determining layer 11. The magnetic pole section 12 includes a laminate of a lower magnetic pole layer 13, a non-magnetic gap layer 14, and an upper magnetic pole layer 15. The magnetic pole section 12 has a width dimension of track width Tw (in a direction of X as shown).

An insulating layer 16 is disposed on both sides of the magnetic pole section 12 in the track width direction (the X direction) and in a height direction (in the Y direction as shown). The top surface of the insulating layer 16 is flush with the top surface of the magnetic pole section 12.

As shown in FIG. 19, a coil layer 17 is provided in a spiral pattern on the insulating layer 16. The coil layer 17 is covered with an insulating layer 18 made of an organic insulating material.

An upper core layer 19 is provided on the magnetic pole section 12 and the insulating layer 18. A base portion 19a of the upper core layer 19 is directly connected to a junction layer (back gap layer) 20, made of a magnetic material, and disposed on the lower core layer 10. In the known magnetic head shown in FIG. 19, a thickness t2 at an apex thereof is larger than a thickness t1 at the leading edge of the upper core layer 19.

In the magnetic head shown in FIG. 19, the insulating layer 18 covering the coil layer 17 has a slope surface 18a facing the recording medium. The upper core layer 19 has a yoke structure provided on the slope surface 18a of the insulating layer 18.

To implement high recording density in an inductive head, overwrite characteristics (OW) must be improved. To improve the OW characteristics, saturation magnetic flux densities in the upper core layer 19, the upper magnetic pole layer 15, the lower magnetic pole layer 13, the lower core layer 10, and the back gap layer 20 are preferably high. A magnetic field generated by the coil layer 17 passes through the upper core layer 19, the upper magnetic pole layer 15, the lower magnetic pole layer 13, the lower core layer 10, and the back gap layer 20.

To heighten a line recording density, the frequency of a recording signal supplied to the inductive head must be increased. However, if the recording signal frequency becomes high, eddy currents occurring in the upper core layer 19 and the lower core layer 10 increase, and an eddy current loss becomes larger accordingly.

Each of the lower core layer 10 and the upper core layer 19 is made of a nickel-iron (NiFe) alloy. To reduce the eddy current, the use of a magnetic material having a high specific resistance, such as FeNiMo, for the upper core layer 19 and the lower core layer 10 has been proposed as disclosed in Japanese Unexamined Patent Application No. 8-212512 (pages 11–12 and FIGS. 16–18), Japanese Unexamined Patent Application Publication No. 9-63016 (pages 5–6 and FIG. 5), Japanese Unexamined Patent Application Publication No. 2000-235911 (pages 3–4 and FIG. 1), and Japanese Unexamined Patent Application Publication No. 2001-76315 (pages 8–9 and FIG. 1).

If the entire upper core layer 19 is merely made of a magnetic material having a high specific resistance, the concentration of an element responsible for magnetization (such as iron) is reduced. The upper core layer 19 provides an insufficient saturation magnetic flux density.

If each of the upper core layer 19 and the lower core layer 10 is produced in a laminate structure in which a layer of a magnetic material having a high specific resistance and a low saturation magnetic flux density and a layer of a magnetic material having a low specific resistance and a high saturation magnetic flux density are laminated, magnetic flux is disturbed in an interface between the two layers.

SUMMARY OF THE INVENTION

Accordingly, it is an object of the present invention to provide a magnetic head that prevents overwrite characteristics thereof from being degraded, and accommodates the use of a high-frequency recording signal, by increasing a saturation magnetic flux density in a region of an upper core layer close to a gap layer and increasing a specific resistance in a region spaced apart from the gap layer.

In a first aspect of the present invention, a magnetic head includes a lower core layer, an upper core layer, a non-magnetic gap layer positioned between the lower core layer and the upper core layer, and a coil layer, provided surrounding a magnetic coupling portion between the lower core layer and the upper core layer, for applying a magnetic field to the lower core layer and the upper core layer. The upper core layer, made of an FeNiX alloy (X being an element of one of rhenium Re and molybdenum Mo), and defined by an lower surface facing the lower core layer and an upper surface opposed to the lower surface, includes a rising portion that gradually rises from a side opposing a recording medium toward a deeper side of the head with the lower surface and the upper surface gradually parting away from the lower core layer, and a core leading portion where the lower surface and the upper surface extend in parallel with the lower core layer. A concentration difference of the upper core layer between a concentration of iron by weight percent and a concentration of the element X by weight percent is smaller at any backward position at a thickness center than at any frontward position, located more frontward than the backward position, at the thickness center in each of the leading portion and the rising portion where the thickness center lies at a half-thickness level of the thickness of the upper core layer between the upper surface and the lower surface thereof, the thickness being along a direction of line normal to the lower surface.

The concentration difference of the upper core layer between a concentration of iron by weight percent and a concentration of the element X by weight percent is smaller at the backward position more backward than the frontward position at the thickness center than at the frontward position at the thickness center in each of the leading portion and the rising portion.

In the FeNiX alloy, magnetism of iron is attributed to the 3d electrons thereof. As the concentration of iron in the alloy increases, the saturation magnetic flux density Bs increases. As the concentration of the element X (one of rhenium Re and molybdenum Mo) in the FeNiX alloy increases, a specific resistance $\rho$ of the alloy is heightened.

As the concentration difference of the FeNiX alloy between the concentration of iron by weight percent and the concentration of the element X by weight percent increases, the concentration of iron in the FeNiX alloy becomes high, and the saturation magnetic flux density Bs increases. As the concentration difference of the FeNiX alloy between the concentration of iron by weight percent and the concentration of the element X by weight percent decreases, the concentration ratio of the element X in the FeNiX alloy becomes high, the specific resistance $\rho$ of the alloy increases, and the saturation magnetic flux density Bs decreases.

In the magnetic head of preferred embodiments of the present invention, the saturation magnetic flux density Bs of the upper core layer may be set to be smaller at the backward position at the thickness center than at the frontward position at the thickness center in one of the core leading portion and the rising portion. The specific resistance $\rho$ of the upper core layer may be set to be larger at the backward position at the thickness center than at the frontward position at the thickness center in one of the core leading portion and the rising portion.

Even if the upper core layer has a single layer structure, the concentration difference of the FeNiX alloy between the concentration of iron by weight percent and the concentration of the element X by weight percent of the upper core layer made of the FeNiX alloy is varied within the upper core layer. The magnetic head of the preferred embodiment of present invention is thus free from a disturbance in the flow of magnetic flux, which is experienced in the known magnetic head having an upper core layer formed of a plurality magnetic layers of different magnetic materials.

The rising portion of the upper core layer is one of major factors that allow the concentration of the FeNiX alloy of the upper core layer to be varied within the upper core layer.

The formation of the upper core layer will be discussed in detail later.

Preferably, the frontward position is at a leading edge opposing the recording medium, and the backward position is at an apex where the upper surface is spaced farthest apart from the lower core layer.

Preferably, the concentration difference is gradually varied from the frontward position to the backward position along a center line that extends at the thickness center of the upper core layer from the opposing side to the deeper side.

In this arrangement, the saturation magnetic flux density Bs of the upper core layer continuously increases from the backward position to the frontward position.

Preferably, the concentration of iron by weight percent of the upper core layer is smaller at the backward position at the thickness center than at the frontward position at the thickness center in each of the core leading portion and the rising portion. The absolute value of the saturation magnetic flux density Bs of the upper core layer at the frontward position thus increases.

Preferably, the concentration of iron by weight percent of the upper core layer is gradually varied from the frontward position to the backward position along a center line that extends the thickness center of the upper core layer from the opposing side to the deeper side.

Preferably, the concentration of the element X by weight percent of the upper core layer is larger at the backward position at the thickness center than at the frontward position at the thickness center in each of the core leading portion and the rising portion.

The concentration of the element X by weight percent of the upper core layer set to be larger at the backward position at the thickness center than at the frontward position at the thickness center causes the saturation magnetic flux density Bs to increase at the frontward position of the upper core layer. Preferably, the concentration of the element X by weight percent of the upper core layer is gradually varied from the frontward position to the backward position along a center line that extends the thickness center of the upper core layer from the opposing side to the deeper side.

In another aspect of the present invention, a magnetic head includes a lower core layer, an upper core layer, a non-magnetic gap layer positioned between the lower core layer and the upper core layer, and a coil layer, provided surrounding a magnetic coupling portion between the lower core layer and the upper core layer, for applying a magnetic field to the lower layer and the upper core layer. The upper core layer, made of an FeNiX alloy (X being an element of one of rhenium Re and molybdenum Mo), and defined by an lower surface facing the lower core layer and an upper surface opposed to the lower surface, includes a rising portion that gradually rises from a side opposing a recording medium toward a deeper side of the head with the lower surface and the upper surface gradually parting away from the lower core layer, and a core leading portion where the lower surface and the upper surface extend in parallel with the lower core layer. A concentration difference of the upper core layer between a concentration of iron by weight percent and a concentration of the element X by weight percent is smaller at an upper position than at a lower position where the lower position is any point in one of the core leading portion and the rising portion and the upper position is any point that is closer to the upper surface than the lower position in the one of the core leading portion and the rising portion.

The above arrangement causes the concentration of iron in the FeNiX alloy at the lower position to become higher, thereby increasing the saturation magnetic flux density Bs. On the other hand, the above arrangement causes the concentration of the element X in the FeNiX alloy at the upper position to become higher, increasing the specific resistance $\rho$ and decreasing the saturation magnetic flux density Bs.

The saturation magnetic flux density Bs becomes high at the lower surface of the upper core layer closer to the coil layer, namely, in a portion of the shortest magnetic path in the upper core layer of the magnetic head of the preferred embodiments of the present invention. Overwrite characteristics of the magnetic head of the preferred embodiments of the present invention are improved. The magnetic head of the preferred embodiments of the present invention thus accommodates a frequency shift of a recording signal to a higher frequency range by increasing the specific resistance on the upper surface of the upper core layer.

The lower position may lie in the lower surface of the upper core layer, and the upper position may lie in the upper surface of the lower core layer.

Preferably, the concentration difference is gradually varied from the lower position to the upper position in one of the core leading portion and the rising portion.

Even if the upper core layer has a single layer structure, the concentration difference of the FeNiX alloy between the concentration of iron by weight percent and the concentration of the element X by weight percent of the upper core layer made of the FeNiX alloy is varied within the upper core layer. The magnetic head of the preferred embodiment of present invention is thus free from a disturbance in the flow of magnetic flux, which is experienced in the known magnetic head having an upper core layer formed of a plurality magnetic layers of different magnetic materials.

Preferably, the thickness of the upper core layer at an apex where the upper surface is spaced farthest apart from the lower core layer is smaller than the thickness of the upper core layer at the leading edge of the upper core layer opposing the recording medium.

To reduce an eddy current loss in the upper core layer, the specific resistance of the material of the upper core layer is increased. Besides the increasing of the specific resistance, the volume of the upper core layer may be increased to reduce the eddy current loss.

To reduce the volume of the upper core layer, the upper core layer may be thinned. If the upper core layer is merely, thinned, the flow of magnetic flux within the upper core layer is impeded, and recording characteristics of the magnetic head are degraded. In the embodiments of the present invention, the specific resistance is increased by reducing the thickness at the apex of the upper core layer, and the thickness of the upper core layer at and in the vicinity of the leading edge thereof, greatly affecting the recording characteristics, is not reduced.

The track width dimension at the apex of the upper core layer is set to be larger than the track width dimension at the junction of the upper core layer. As a result, the volume of the upper core layer is increased. If the thickness of the upper core layer at the apex is set to smaller than the thickness of the upper core layer at the leading edge, the specific resistance of the upper core layer is efficiently increased.

Preferably, the magnetic head further includes a magnetic pole layer at least one of regions between the lower surface of the upper core layer and the non-magnetic gap layer and between the non-magnetic gap layer and the lower core layer, wherein the magnetic pole layer is narrower in a width dimension than the upper core layer.

DESCRIPTION OF THE PREFERRED EMBODIMENTS

Figure 1:
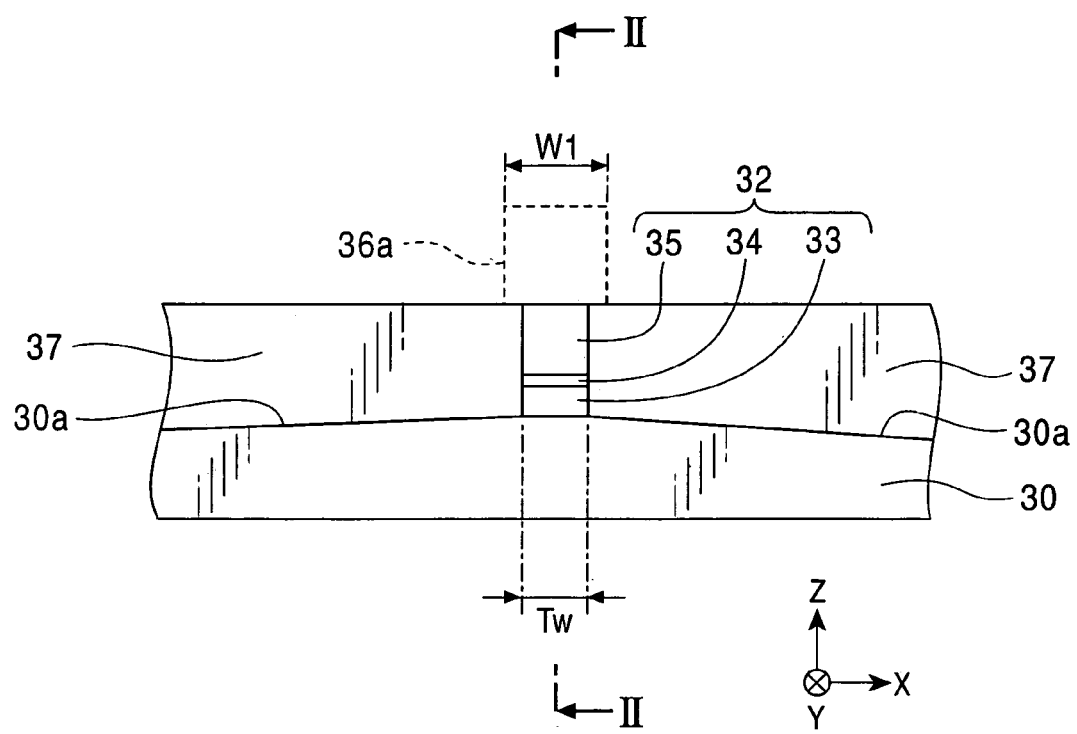
FIG. 1 is a front view illustrating a magnetic head in accordance with a first preferred embodiment of the present invention.
Figure 2:
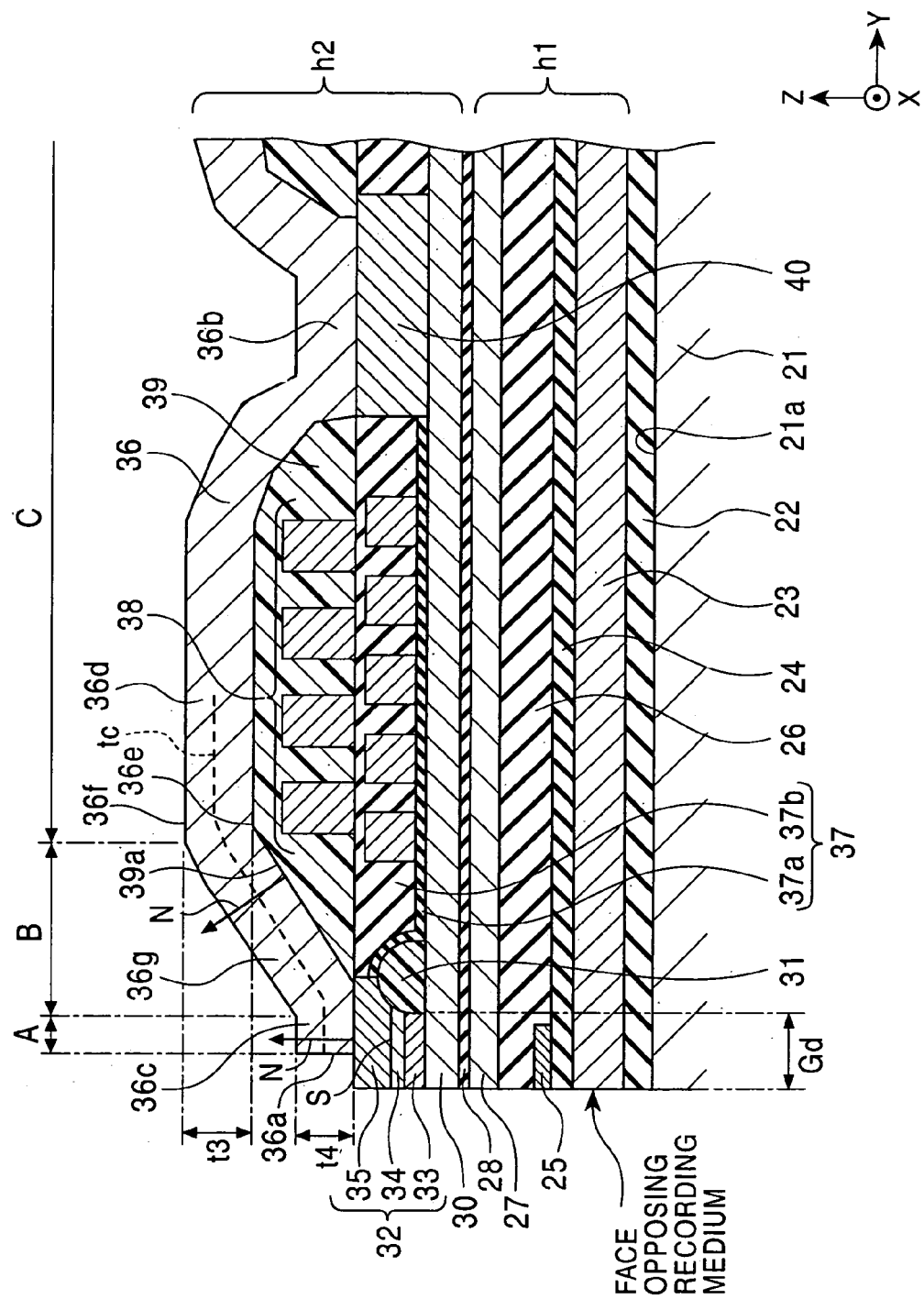
FIG. 2 is a sectional view of the magnetic head of the first preferred embodiment of the present invention.

FIG. 1 is a front view illustrating part of a magnetic head in accordance with a first preferred embodiment of the present invention. FIG. 2 is a sectional view of the magnetic head taken along dot-and-dash chain line II—II in FIG. 1.

FIG. 2 illustrates a floating magnetoresistive inductive composite thin film head (hereinafter simply referred to a magnetic head), which is a laminate of a magnetoresistive head h1 arranged on a trailing side surface 21a of a slider 21 made of a ceramic and a write inductive head h2. FIG. 1 does not show the magnetoresistive head h1.

As shown in FIG. 2, a lower shield layer 23, made of a magnetic material such as NiFe, is disposed on an aluminum oxide ($Al_2O_3$) film 22 provided on the trailing side surface 21a of the slider 21. A lower gap layer 24, made of an insulator material, is disposed on the lower shield layer 23.

A magnetoresistive effect element 25, such as an anisotropic magnetoresistive (AMR) effect element, a giant magnetoresistive (GMR) effect element, or a tunnel-type magnetoresistive (TMR) effect element, is disposed on the lower gap layer 24 in a height direction (the Y direction as shown) from the edge opposing a recording medium. An upper gap layer 26 is disposed on the magnetoresistive effect element 25 and the lower gap layer 24. An upper shield layer 27, made of a magnetic material such as NiFe, is disposed on the upper shield layer 27. The magnetoresistive (MR) head h1 is formed of a laminate of the lower shield layer 23 through the upper shield layer 27.

A lower core layer 30 of the inductive head h2 is laminated on a separation layer 28, made of aluminum oxide ($Al_2O_3$), disposed on the upper shield layer 27. The lower core layer 30 is made of a nickel-iron (NiFe) alloy. A Gd determining layer 31, disposed on the lower core layer 30, is made of an insulating material.

A magnetic pole section 32, having a track width dimension smaller than that of the upper core layer, extends from the face opposing the recording medium to the Gd determining layer 31.

The magnetic pole section 32 includes a lower magnetic pole layer 33, a non-magnetic gap layer 34, and an upper magnetic pole layer 35 laminated in that order from below.

The lower core layer 30 is directly plated with the lower magnetic pole layer 33. The non-magnetic gap layer 34, arranged on the lower magnetic pole layer 33, is preferably made of a non-magnetic metal suitable for plating. More specifically, the non-magnetic gap layer 34 may be made of at least one material selected from the group consisting of NiP, NiPd, NiW, NiMo, Au, Pt, Rh, Pd, Ru, and Cr. If the non-magnetic gap layer 34 is made of a non-magnetic metallic material suitable for plating, the lower magnetic pole layer 33, the non-magnetic, gap layer 34, and the upper magnetic pole layer 35 are continuously plated.

In the first preferred embodiment, NiP is used for the non-magnetic gap layer 34. The non-magnetic gap layer 34, made of NiP, appropriately remains in a non-magnetic state.

The upper magnetic pole layer 35, disposed on the non-magnetic gap layer 34, is magnetically coupled with an upper core layer 36 disposed thereon.

A gap depth (Gd) is defined by a length dimension of an interface S between the upper magnetic pole layer 35 and the non-magnetic gap layer 34 in a height direction (the length of the interface S from the face opposing the recording medium to the Gd determining layer 31).

Alternatively, the magnetic pole section 32 may be formed of two layers of the non-magnetic gap layer 34 and the upper magnetic pole layer 35.

An insulator 37 (an insulating layer 37a and an insulating layer 37b), made of an inorganic material such as aluminum oxide ($Al_2O_3$) or silicon dioxide ($SiO_2$), is disposed on both sides of the magnetic pole section 32 in a track width direction (in the X direction as shown) and behind the magnetic pole section 32 in the height direction. The top surface of the insulator 37 is flush with the top surface of the magnetic pole section 32.

As shown in FIG. 2, a coil layer 38 is patterned in a two-layer structure within the insulator 37 and above the insulator 37. The coil layer 38 is covered with an insulating layer 39 made of an organic insulating material.

The upper core layer 36 is disposed in a pattern on the magnetic pole section 32 and the insulating layer 39 using the frame plating technique.

A base portion 36b of the upper core layer 36 is directly connected to a junction layer (a back gap layer) 40 made of a magnetic material such as NiFe.

Referring to FIG. 1, the magnetic pole section 32 has a track width dimension of Tw in the track width direction (in the X direction).

The leading edge 36a of the upper core layer 36 opposing the recording medium has a track width dimension of W1. The track width dimension W1 is larger than the track width dimension of Tw.

As shown in FIG. 1, a upper surface 30a of the lower core layer 30 is sloped downwardly at it goes away from the side of the magnetic pole section 32 in the track width direction (in the X direction as shown). This arrangement controls the generation of side fringing.

The leading edge 36a of the upper core layer 36 is recessed from the face opposing the recording medium (in the Y direction). As shown in FIG. 1, the lower core layer 30 and the magnetic pole section 32 are exposed to the face opposing the recording medium, and the leading edge 36a of the upper core layer 36 remains unexposed to the face opposing the recording medium.

Figure 3:
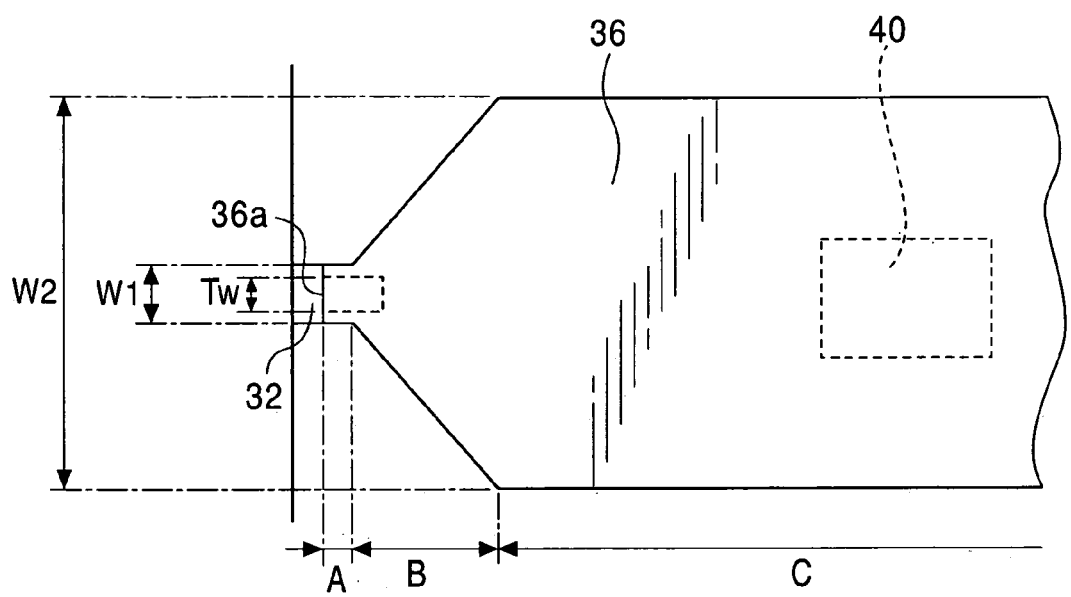
FIG. 3 is a top view of an upper core layer of the magnetic head of the first preferred embodiment of the present invention.

FIG. 3 is a plan view illustrating the upper core layer 36 and the magnetic pole section 32 of the magnetic, head of FIGS. 1 and 2, viewed from above (namely in a direction opposite from the Z direction).

The upper core layer 36 may be divided into a front section A, an intermediate section B, and a rear section C. The rear section C has a dimension W2 in the track width direction larger than the track width dimension of W1 of the leading edge 36a. The track width dimension of the intermediate section B is gradually narrowed toward the front section A, and is then connected to the front section A having the track width dimension of W1.

As shown in FIG. 2, the upper core layer 36 has a lower surface 36e facing the lower core layer 30 and an upper surface 36f opposed from the lower surface 36e in the first preferred embodiment. The upper core layer 36 includes a rising portion 36g that gradually rises from the face opposing the recording medium while extending toward a deeper side of the head (in the Y direction) with the lower surface 36e and the upper surface 36f gradually parting away from the lower core layer 30, and a core leading portion 36c where the lower surface 36e and the upper surface 36f extend in parallel with the lower core layer 30. The upper core layer 36 has a yoke structure.

As shown, the intermediate section B is disposed on a slope surface 39a, becoming the rising portion 36g. A portion of the front section A and a portion of the rear section C may be disposed on the slope surface 39a, forming part of the rising portion 36g.

The upper magnetic pole layer 35 is made of a nickel-iron (NiFe) alloy or a cobalt-iron (CoFe) alloy. Preferably, the upper magnetic pole layer 35 is formed of a single layer made of a material higher in saturation magnetic flux density than the upper core layer 36, or formed of a multilayer structure containing at least two layers with one layer, positioned to the side of the upper magnetic pole layer 35, made of a material higher in saturation magnetic flux density than the other layer.

Like the upper magnetic pole layer 35, the lower magnetic pole layer 33 is also made of a nickel-iron (NiFe) alloy or a cobalt-iron (CoFe) alloy. Preferably, the lower magnetic pole layer 33 is formed of a single layer made of a material higher in saturation magnetic flux density than the material of the lower core layer 30, or formed of a multilayer structure containing at least two layers with one layer, positioned to the side of the non-magnetic gap layer 34, made of a material higher in saturation magnetic flux density than the other layer.

The upper core layer 36 is made of an FeNiX alloy (X is one of rhenium Re and molybdenum Mo) in the first preferred embodiment of the present invention.

Let tc represent a thickness center that extends at a half-thickness level of the thickness of the upper core layer 36 between the lower surface 36e and the upper surface 36f in each of the core leading portion 36c and the rising portion 36g of the upper core layer 36 with the thickness being along a direction of line N normal to the lower surface 36e, and let a concentration difference of the upper core layer 36 be defined by a difference (a concentration of iron by weight percent minus a concentration of the element X by weight percent). In one of the core leading portion 36c and the rising portion 36g, the concentration difference is smaller at a backward position at the thickness center tc than at a frontward position at the thickness center tc more frontward than the backward position. The word frontward refers to a direction looking in the face opposing the recording medium (in a direction opposite from the Y direction), and the word backward refers to a direction looking in the deeper side of the magnetic head (the Y direction).

In the FeNiX alloy, the magnetism of iron is attributed to the 3d electrons thereof. As the concentration of iron in the alloy increases, the saturation magnetic flux density Bs increases. As the concentration of the element X in the FeNiX alloy increases, a specific resistance ρ of the alloy is heightened.

As the concentration difference of the FeNiX alloy between the concentration of iron by weight percent and the concentration of the element X by weight percent increases, the concentration of iron in the FeNiX alloy becomes high, and the saturation magnetic flux density Bs increases. As the concentration difference of the FeNiX alloy between the concentration of iron by weight percent and the concentration of the element X by weight percent decreases, the concentration of the element X in the FeNiX alloy becomes high, the specific resistance ρ of the alloy increases, and the saturation magnetic flux density Bs decreases.

In the magnetic head of preferred embodiments of the present invention, the saturation magnetic flux density Bs of the upper core layer 36 is set to be smaller at the backward position at the thickness center tc than at the frontward position at the thickness center tc in one of the core leading portion 36c and the rising portion 36g. The specific resistance ρ of the upper core layer 36 is set to be larger at the backward position at the thickness center tc than at the frontward position at the thickness center tc in one of the core leading portion 36c and the rising portion 36g.

Even if the upper core layer 36 has a single layer structure, the concentration difference of the FeNiX alloy between the concentration of iron by weight percent and the concentration of the element X by weight percent of the upper core layer 36 made of the FeNiX alloy is varied within the upper core layer 36. The magnetic head is free from a disturbance in the flow of magnetic flux, which is experienced in the known magnetic head having an upper core layer formed of a plurality magnetic layers of different magnetic materials.

The rising portion 36g of the upper core layer 36, which gradually rises from the side opposing the recording medium toward the deeper side of the head with the lower surface 36e and the upper surface 36g gradually parting away from the lower core layer 30, is one of major factors that allow the concentrations of the elements of the FeNiX alloy of the upper core layer 36 to be varied within the upper core layer 36.

The structure of the upper core layer will be discussed in detail later.

The frontward position is at the leading edge opposing the recording medium, and the backward position is at an apex 36d where the upper surface 36f is spaced farthest apart from the lower core layer 30.

Preferably, the concentration difference is gradually varied from the frontward position to the backward position along a center line that extends at the thickness center from the opposing side to the deeper side.

The saturation magnetic flux density Bs of the upper core layer 36 continuously increases toward the frontward position.

The absolute value of the saturation magnetic flux density Bs of the upper core layer 36 is increased by setting the concentration of iron by weight percent of the upper core layer 36 to be smaller at the backward position at the thickness center than at the frontward position at the thickness center tc in one of the core leading portion 36c and the rising portion 36g.

Preferably, the concentration of iron by weight percent is gradually varied from the frontward position to the backward position along a center line that extends at the thickness center from the opposing side to the deeper side.

Preferably, the concentration of the element X by weight percent of the upper core layer 36 is larger at the backward position at the thickness center tc than at the frontward position at the thickness center tc in one of the core leading portion 36c and the rising portion 36g.

The magnitude of the saturation magnetic flux density Bs at the frontward position of the upper core layer 36 is increased by setting the concentration of the element X of the FeNiX alloy by weight percent to be larger at the backward position than at the frontward position. Preferably, the concentration of the element X of the FeNiX alloy by weight percent is gradually varied along the center line from the frontward position to the backward position.

The concentration difference of the FeNiX alloy between the concentration of iron by weight percent and the concentration of the element X by weight percent of the upper core layer 36 is smaller at an upper position than at a lower position where the lower position is any point in one of the core leading portion 36c and the rising portion 36g and the upper position is any point that is closer to the upper surface 36f than the lower position in the one of the core leading portion 36c and the rising portion 36g. The upper position and the lower position are referenced with respect to the Z direction.

The concentration of iron of the FeNiX alloy by weight percent is high at the lower position, causing the saturation magnetic flux density Bs to be increased. The concentration of the element X of the FeNiX alloy by weight percent is high at the upper position, increasing the specific resistance ρ and decreasing the saturation magnetic flux density Bs.

More specifically, the saturation magnetic flux density Bs becomes high at the lower surface 36e of the upper core layer 36 closer to the coil layer, namely, in a portion of the shortest magnetic path in the upper core layer 36 of the magnetic head. The overwrite characteristics of the magnetic head h2 are thus improved. The magnetic head h2 thus accommodates a frequency shift of a recording signal to a higher frequency range by increasing the specific resistance ρ on and in the vicinity of the upper surface 36f of the upper core layer 36.

The lower position lies in the lower surface 36e of the upper core layer 36, and the upper position lies in the upper surface 36f of the lower core layer 36.

The concentration difference of the FeNiX alloy between the concentration of iron by weight percent and the concentration of the element X by weight percent of the upper core layer 36 is gradually varied from the lower position to the upper position in one of the core leading portion 36c and the rising portion 36g. Even if the upper core layer 36 has a single layer structure, the concentration difference of the FeNiX alloy between the concentration of iron by weight percent and the concentration of the element X by weight percent of the upper core layer 36 made of the FeNiX alloy is varied within the upper core layer 36. The magnetic head is free from a disturbance in the flow of magnetic flux, which is experienced in the known magnetic head having an upper core layer formed of a plurality magnetic layers of different magnetic materials.

Preferably, the thickness t3 of the upper core layer 36 at the apex where the upper surface 36f is spaced farthest apart from the lower core layer 30 is smaller than the thickness t4 of the upper core layer 36 at the leading edge 36a of the upper core layer 36 opposing the recording medium.

To reduce an eddy current loss in the upper core layer 36, the specific resistance of the material of the upper core layer 36 must be increased. Besides the increasing of the specific resistance, the volume of the upper core layer 36 may be increased to reduce the eddy current loss.

To reduce the volume of the upper core layer 36, the upper core layer 36 must be thinned. If the entire thickness of the upper core layer 36 is merely reduced, the flow of magnetic flux within the upper core layer 36 is impeded, and recording characteristics of the magnetic head are degraded. In the embodiments of the present invention, the specific resistance is increased by reducing the thickness at the apex 36d of the upper core layer 36, and the thickness of the upper core layer 36 at and in the vicinity of the leading edge 36a thereof, greatly affecting the recording characteristics, is not reduced.

Figure 4:
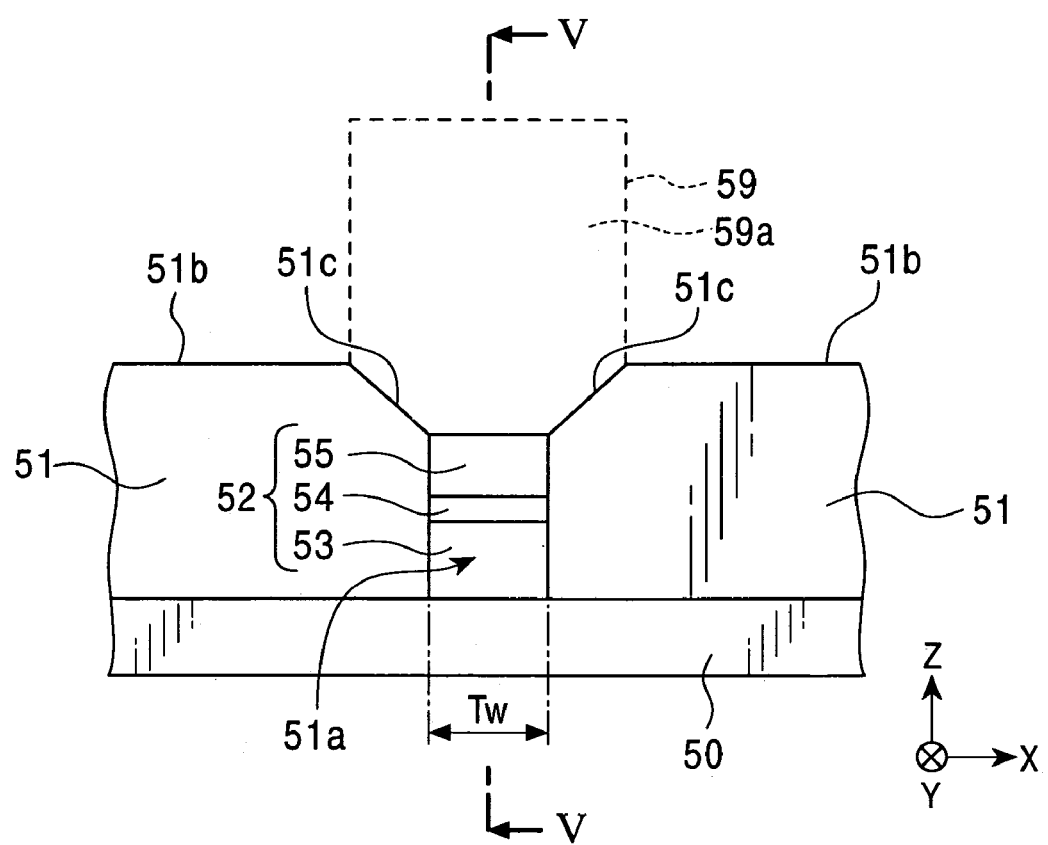
FIG. 4 is a front view illustrating a magnetic head in accordance with a second preferred embodiment of the present invention.
Figure 5:
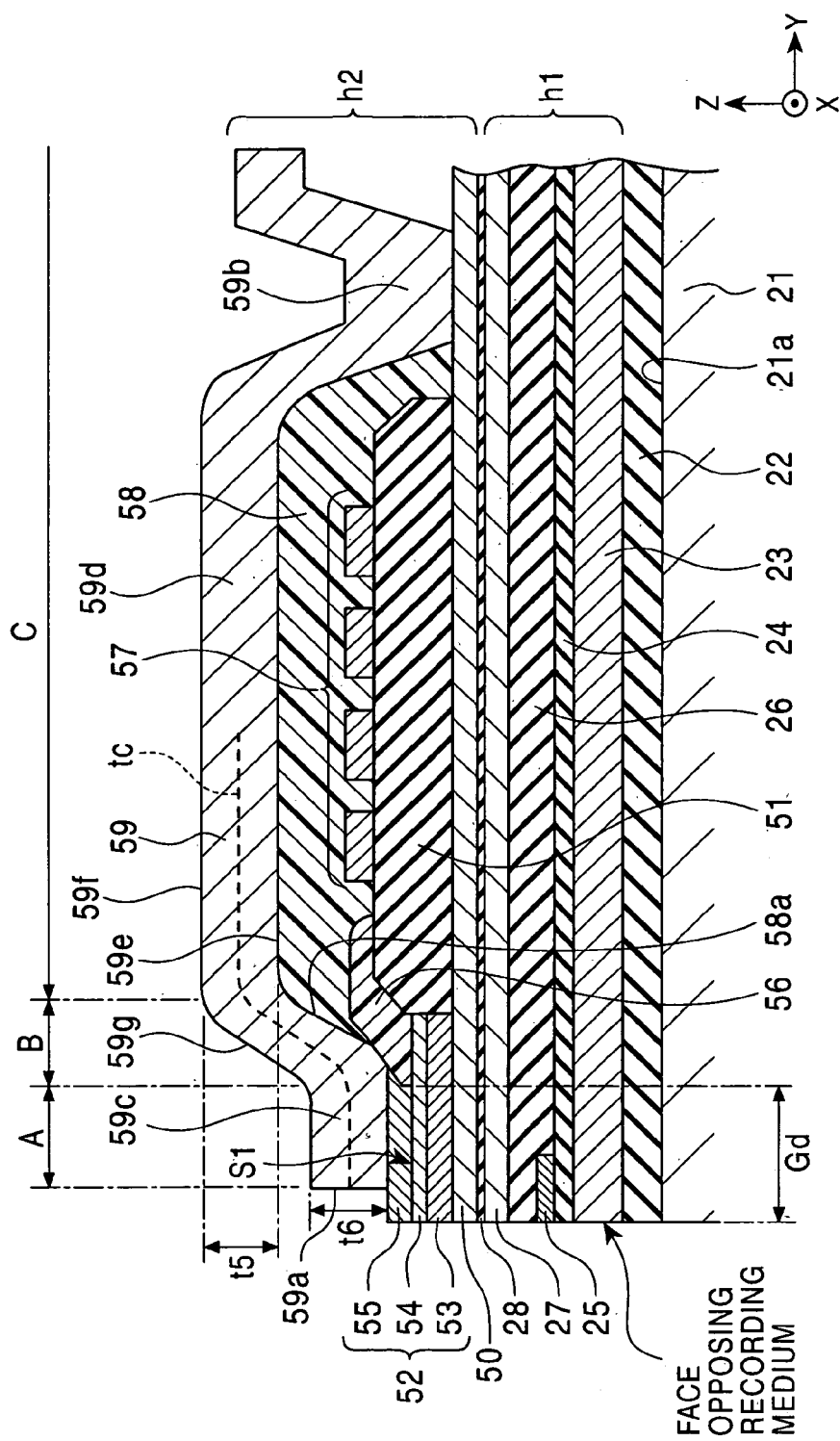
FIG. 5 is a sectional view of the magnetic head of the second preferred embodiment of the present invention.

FIG. 4 is a front view showing the structure of a magnetic head in accordance with a second preferred embodiment of the present invention. FIG. 5 is a sectional view of the magnetic head taken along line V—V in FIG. 4. FIG. 4 shows an inductive head only. In the second preferred embodiment, the structure of the MR head h1 remains unchanged from that of the MR head illustrated in FIG. 2.

Referring to FIG. 4, an insulating layer 51, made of one of aluminum oxide ($Al_2O_3$) and silicon dioxide ($SiO_2$), is disposed on a lower core layer 50. The lower core layer 50 has a track width forming slit 51a having a predetermined length and extending backward from the face opposing the recording medium in the height direction (in the Y direction). The track width forming slit 51a has a track width dimension of Tw at the face opposing the recording medium.

Arranged in the track width forming slit 51a is a magnetic section 52 which is formed of a lower magnetic pole layer 53, a gap layer 54, and an upper magnetic pole layer 55 laminated from below in that order.

The lower core layer 50 is directly plated with the lower magnetic pole layer 53. The gap layer 54, arranged on the lower magnetic pole layer 53, is preferably made of a non-magnetic metal for plating. More specifically, the non-magnetic gap layer 54 may be made of at least one material selected from the group consisting of NiP, NiPd, NiW, NiMo, Au, Pt, Rh, Pd, Ru, and Cr. If the gap layer 54 is made of a non-magnetic metallic material suitable for plating, the lower magnetic pole layer 53, the non-magnetic gap layer 54, and the upper magnetic pole layer 55 are continuously plated.

In the second preferred embodiment, NiP is used for the gap layer 54. The gap layer 54, made of NiP, appropriately remains in a non-magnetic state.

Alternatively, the magnetic pole section 52 may be formed of two layers of the gap layer 54 and the upper magnetic pole layer 55.

As shown in FIG. 5, a Gd determining layer 56 is disposed on the gap layer 54 and extends from a location spaced away from the face opposing the recording medium by a gap depth (Gd) to over the insulating layer 51. The gap depth (Gd) is defined by a length dimension of an interface S1 between the upper magnetic pole layer 55 and the gap layer 54 in a height direction (the length of the interface S from the face opposing the recording medium to the Gd determining layer 56).

A coil layer 57 is formed in a spiral pattern on the insulating layer 51. The coil layer 57 is covered with an insulating layer 58 made of an organic material.

An upper core layer 59 is disposed on the upper magnetic pole layer 55 and the insulating layer 58. The upper core, layer 59 is magnetically coupled with the upper magnetic pole layer 55. A base portion 59b of the upper core layer 59 is connected to the lower core layer 50.

The leading edge 59a of the upper core layer 59 facing the recording medium is recessed in the height direction (in the Y direction) from the face opposing the recording medium. More specifically, the lower core layer 50 and the magnetic section 52 are exposed to the face opposing the recording medium, and the leading edge 59a of the upper core layer 59 remains unexposed to the face opposing the recording medium as shown in FIG. 4.

Referring to FIG. 4, with its slope surfaces 51c, the track width forming slit 51a gradually widens in the track width dimension (in the X direction) as it rises from the upper surface of the upper magnetic pole layer 55 to the upper surface 51b of the insulating layer 51.

As shown in FIG. 4, the leading edge 59a of the upper core layer 59 extends on the upper surface of the upper magnetic pole layer 55 and along the slope surfaces 51c in a manner such that the leading edge 59a parts away from the lower core layer 50. This arrangement controls the generation of side fringing.

The upper core layer 59 is divided into a front section A, an intermediate section B, and a rear section C. The plan view of the upper core layer 59 is similar to the plan view of the insulating layer 39 shown in FIG. 3. The track width dimension of the rear section C is larger than the track width dimension of the leading edge 59a. The track width dimension of the intermediate section B gradually narrowing toward the front section A until the intermediate section B is connected to the front section A.

As illustrated in FIG. 5, the upper core layer 59 has a lower surface 59e facing the lower core layer 50 and an upper surface 59f opposed from the lower surface 59e in the second preferred embodiment. The upper core layer 59 includes a rising portion 59g that gradually rises from the face opposing the recording medium while extending toward a deeper side of the head (in the Y direction as shown) with the lower surface 59e and the upper surface 59f gradually parting away from the lower core layer 50, and a core leading portion 59c where the lower surface 59e and the upper surface 59f extend in parallel with the lower core layer 50. The upper core layer 59 has a yoke structure.

The intermediate section B is disposed on a slope surface 58a, thereby becoming the rising portion 59g as shown in FIG. 5. A portion of the front section A and a portion of the rear section C may be disposed on the slope surface 58a.

The upper magnetic pole layer 55 is made of a nickel-iron (NiFe) alloy or a cobalt-iron (CoFe) alloy. Preferably, the upper magnetic pole layer 55 is formed of a single layer made of a material higher in saturation magnetic flux density than the upper core layer 59, or formed of a multilayer structure containing at least two layers with one layer, positioned to the side of the gap layer 54, made of a material higher in saturation magnetic flux density than the other layer.

Like the upper magnetic pole layer 55, the lower magnetic pole layer 53 is also made of a nickel-iron (NiFe) alloy or a cobalt-iron (CoFe) alloy. Preferably, the lower magnetic pole layer 53 is formed of a single layer made of a material higher in saturation magnetic flux density than the material of the lower core layer 50, or formed of a multilayer structure containing at least two layers with one layer, positioned to the side of the gap layer 54, made of a material higher in saturation magnetic flux density than the other layer.

The upper core layer 59 is made of an FeNiX alloy (the element X is one of rhenium Re and molybdenum Mo) in the second preferred embodiment of the present invention.

In one of the core leading portion 59c and the rising portion 59g, the concentration difference (concentration of iron by weight percent minus concentration of the element X by weight percent) of the upper core layer 59 is smaller at a backward position at the thickness center tc than at a frontward position at the thickness center tc more frontward than the backward position.

In the magnetic head of the second preferred embodiment of the present invention, the saturation magnetic flux density Bs of the upper core layer 59 is set to be smaller at the backward position at the thickness center tc than at the frontward position at the thickness center tc than one of the core leading portion 59c and the rising portion 59g. The specific resistance ρ of the upper core layer 59 is set to be larger at the backward position at the thickness center tc than at the frontward position at the thickness center tc in one of the core leading portion 59c and the rising portion 59g.

Even if the upper core layer 59 has a single layer structure, the concentration difference of the FeNiX alloy between the concentration of iron by weight percent and the concentration of the element X by weight percent of the upper core layer 59 made of the FeNiX alloy is varied within the upper core layer 59. The magnetic head is free from a disturbance in the flow of magnetic flux, which is experienced in the known magnetic head having an upper core layer formed of a plurality magnetic layers of different magnetic materials.

The frontward position is at the leading edge 59a opposing the recording medium, and the backward position is at an apex 59d where the upper surface 59f is spaced farthest apart from the lower core layer 50 in the rising portion 59g.

The absolute value of the saturation magnetic flux density Bs of the upper core layer 59 at the frontward position is increased by setting the concentration of iron by weight percent of the upper core layer 59 to be smaller at the backward position at the thickness center tc than at the frontward position at the thickness center tc in one of the core leading portion 59c and the rising portion 59g.

Preferably, the concentration of the element X by weight percent of the upper bore layer 59 is larger at the backward position at the thickness center tc than at any frontward position at the thickness center tc in one of the core leading portion 59c and the rising portion 59g.

The concentration difference of the FeNiX alloy between the concentration of iron by weight percent and the concentration of the element X by weight percent of the upper core layer 59 is smaller at an upper position than at a lower position where the lower position is any point in one of the core leading portion 59c and the rising portion 59g and the upper position is any point that is closer to the upper surface 59f than the lower position in the one of the core leading portion 59c and the rising portion 59g.

The concentration of iron of the FeNiX alloy by weight percent is high at the lower position, causing the saturation magnetic flux density Bs to be increased. The concentration of the element X of the FeNiX alloy by weight percent is high at the upper position, increasing the specific resistance ρ and decreasing the saturation magnetic flux density Bs.

More specifically, the saturation magnetic flux density Bs becomes high at the lower surface 59e of the upper core layer 59 closer to the coil layer, namely, in a portion of the shortest magnetic path in the upper core layer 59 of the magnetic head. The overwrite characteristics of the magnetic head are improved. The magnetic head thus accommodates a frequency shift of a recording signal to a higher frequency range by increasing the specific resistance ρ on and in the vicinity of the upper surface 59f of the upper core layer 59.

The lower position lies in the lower surface 59e of the upper core layer 59, and the upper position lies in the upper surface 59f of the lower core layer 59.

The concentration difference of the FeNiX alloy between the concentration of iron by weight percent and the concentration of the element X by weight percent of the upper core layer 59 is preferably gradually varied from the lower position to the upper position in one of the core leading portion 59c and the rising portion 59g. Even if the upper core layer 59 has a single layer structure, the concentration difference of the FeNiX alloy between the concentration of iron by weight percent and the concentration of the element X by weight percent of the upper core layer 59 made of the FeNiX alloy is varied within the upper core layer 59. The magnetic head is free from a disturbance in the flow of magnetic flux, which is experienced in the known magnetic head having an upper core layer formed of a plurality magnetic layers of different magnetic materials.

Preferably, the thickness t5 of the upper core layer 59 at the apex 59d where the upper surface 59f is spaced farthest apart from the lower core layer 50 is smaller than the thickness t6 of the upper core layer 59 at the leading edge 59a opposing, the recording medium.

The resistance of the upper core layer 59 is increased by reducing the thickness t5 at the apex 59d of the upper core layer 59. An increased resistance leads to a reduced eddy current loss in the upper core layer 59. The thickness of the upper core layer 59 at and in the vicinity of the leading edge 59a, which greatly affects the recording characteristics, is not reduced.

Figure 6:
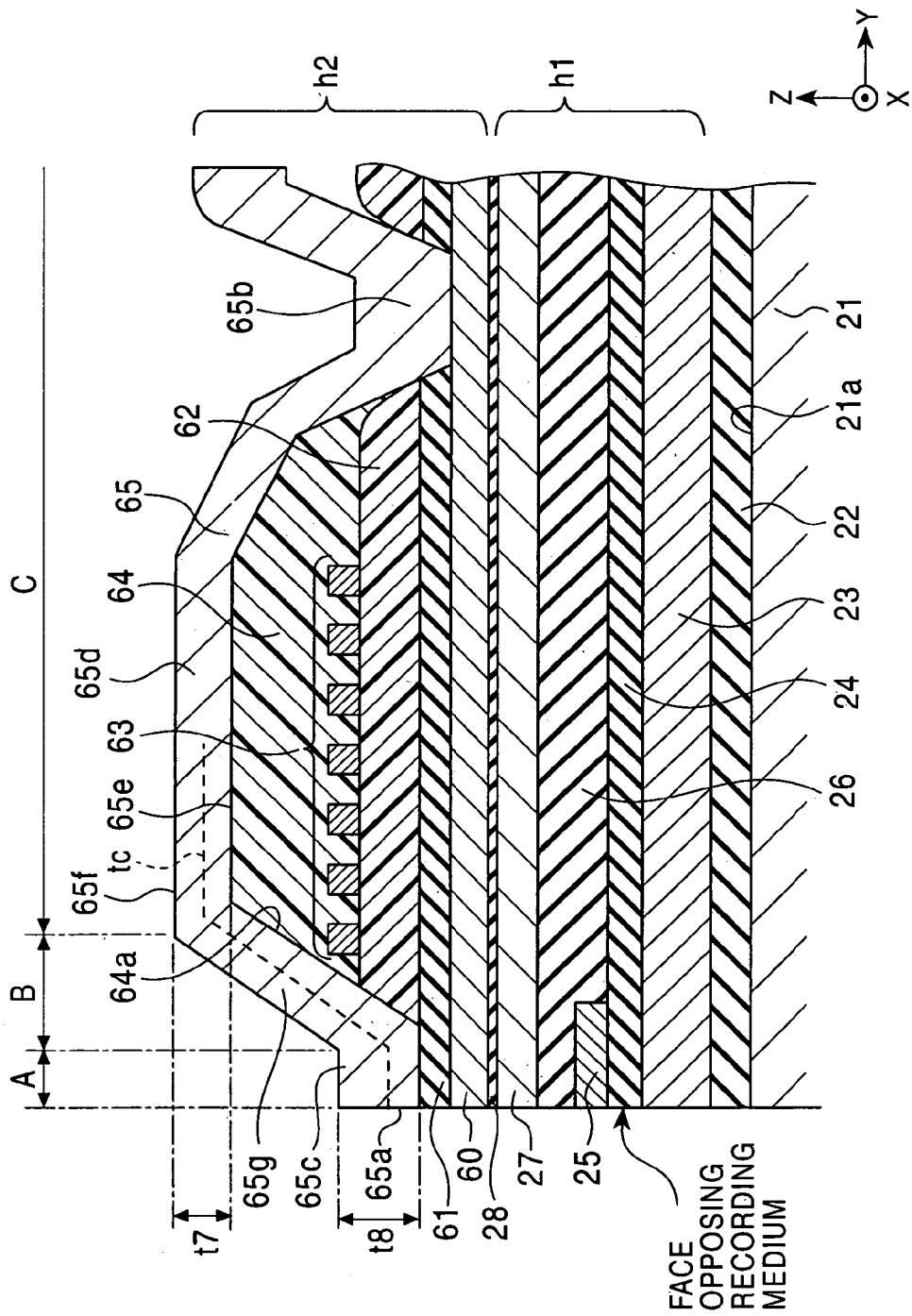
FIG. 6 is a sectional view of a magnetic head in accordance with a third preferred embodiment of the present invention.

FIG. 6 is a sectional view of a magnetic head in accordance with a third preferred embodiment of the present invention.

An MR head h1 in the third preferred embodiment is identical to the MR head h1 shown in FIG. 1.

The magnetic head shown in FIG. 6 includes a gap layer (non-magnetic layer) 61, made of alumina, disposed on a lower core layer 60. An insulating layer 62, made of polyimide or a resist material, is disposed on the gap layer 61. A coil layer 63 is arranged in a spiral pattern in a plan view on the insulating layer 62. The coil layer 63 is made of a non-magnetic conductive material having a smaller resistance, such as copper (Cu). The coil layer 63 is surrounded by and covered with an insulating layer 64 made of polyimide or a resist material. An upper core layer 65, made of a soft magnetic material, is disposed on the gap layer 61 and the insulating layer 64. A base portion 65b of the upper core layer 65 is magnetically coupled to the lower core layer 60.

In the third preferred embodiment as well, the upper core layer 65 is made of an FeNiX alloy (X is an element of one of rhenium Re and molybdenum Mo). The upper core layer 65 has a lower surface 65e facing the lower core layer 60 and an upper surface 65f opposed from the lower surface 65e. The upper core layer 65 includes a rising portion 65g that gradually rises from the face opposing the recording medium while extending toward a deeper side of the head (in the Y direction as shown) with the lower surface 65e and the upper surface 59f gradually parting away from the lower core layer 60, and a core leading portion 65c where the lower surface 65e and the upper surface 65f extend in parallel with the lower core layer 60. The upper core layer 65 has a yoke structure.

As shown in FIG. 6, an intermediate section B of the upper core layer 65 is laminated on a slope surface 64a. A portion of a front section A and a portion of a rear section C of the upper core layer 65 may be disposed on the slope surface 64a.

Let tc represent a thickness center that extends at a half-thickness level of the thickness of the upper core layer 65 between the lower surface 65e and the upper surface 65f in each of the core leading portion 65c and the rising portion 65g of the upper core layer 65 with the thickness being along a direction of line normal to the lower surface. 65e, and let a concentration difference of the upper core layer 65 be defined by a difference (a concentration of iron by weight percent minus a concentration of the element X by weight percent). In one of the core leading portion 65c and the rising portion 65g, the concentration difference is smaller at a backward position at the thickness center tc than at a frontward position at the thickness center tc more frontward than the backward position.

In the magnetic head of the third preferred embodiment of the present invention, the saturation magnetic flux density Bs of the upper core layer 65 is set to be smaller at the backward position at the thickness center tc than at the frontward position at the thickness center tc. The specific resistance ρ of the upper core layer 65 is set to be larger at the backward position at the thickness center tc than at the frontward position at the thickness center tc in one of the core leading portion 65c and the rising portion 65g.

Even if the upper core layer 65 has a single layer structure, the concentration difference of the FeNiX alloy between the concentration of iron by weight percent and the concentration of the element X by weight percent of the upper core layer 65 made of the FeNiX alloy is varied within the upper core layer 65. The upper core layer 65 is free from a disturbance in the flow of magnetic flux, which is experienced in the known upper core layer formed of a plurality magnetic layers of different magnetic materials.

For example, the frontward position is at the leading edge 65a opposing the recording medium, and the backward position is at an apex 65d where the upper surface 65f is spaced farthest apart from the lower core layer 60 in the rising portion 65g.

The absolute value of the saturation magnetic flux density Bs of the upper core layer 65 at the frontward position is increased by setting the concentration of iron by weight percent of the upper core layer 65 to be smaller at the backward position at the thickness center tc than at the frontward position at the thickness center tc in one of the core leading portion 65c and the rising portion 65g.

Preferably; the concentration of the element X by weight percent of the upper core layer 65 is larger at the backward position at the thickness center tc than at any frontward position at the thickness center tc in one of the core leading portion 65c and the rising portion 65g.

The concentration difference of the FeNiX alloy between the concentration of iron by weight percent and the concentration of the element X by weight percent of the upper core layer 65 is smaller at an upper position than at a lower position where the lower position is any point in one of the core leading portion 65c and the rising portion 65g and the upper position is any point that is closer to the upper surface 65f than the lower position in the one of the core leading portion 65c and the rising portion 65g.

The concentration of iron of the FeNiX alloy by weight percent is high at the lower position, causing the saturation magnetic flux density Bs to be increased. The concentration of the element X of the FeNiX alloy by weight percent is high at the upper position, increasing the specific resistance ρ and decreasing the saturation magnetic flux density Bs.

More specifically, the saturation magnetic flux density Bs becomes high at the lower surface 65e of the upper core layer 65 closer to the coil layer, namely, in a portion of the shortest magnetic path in the upper core layer 65 of the magnetic head. The overwrite characteristics of the magnetic head are improved. The magnetic head accommodates a frequency shift of a recording signal to a higher frequency range by increasing the specific resistance ρ on and in the vicinity of the upper surface 65f of the upper core layer 65.

The lower position lies in the lower surface 65e of the upper core layer 65, and the upper position lies in the upper surface 65f of the lower core layer 65.

The concentration difference is preferably gradually varied from the lower position to the upper position in one of the core leading portion 65c and the rising portion 65g. Even if the upper core layer 65 has a single layer structure, the concentration difference of the FeNiX alloy between the concentration of iron by weight percent and the concentration of the element X by weight percent of the upper core layer 65 made of the FeNiX alloy is varied within the upper core layer 65. The upper core layer 65 is free from a disturbance in the flow of magnetic flux, which is experienced in the known upper core layer formed of a plurality magnetic layers of different magnetic materials.

Preferably, the thickness t7 of the upper core layer 65 at the apex 65d where the upper surface 65f is spaced farthest apart from the lower core layer 60 is smaller than the thickness t8 of the upper core layer 65 at the leading edge 65a opposing the recording medium.

Figure 7:
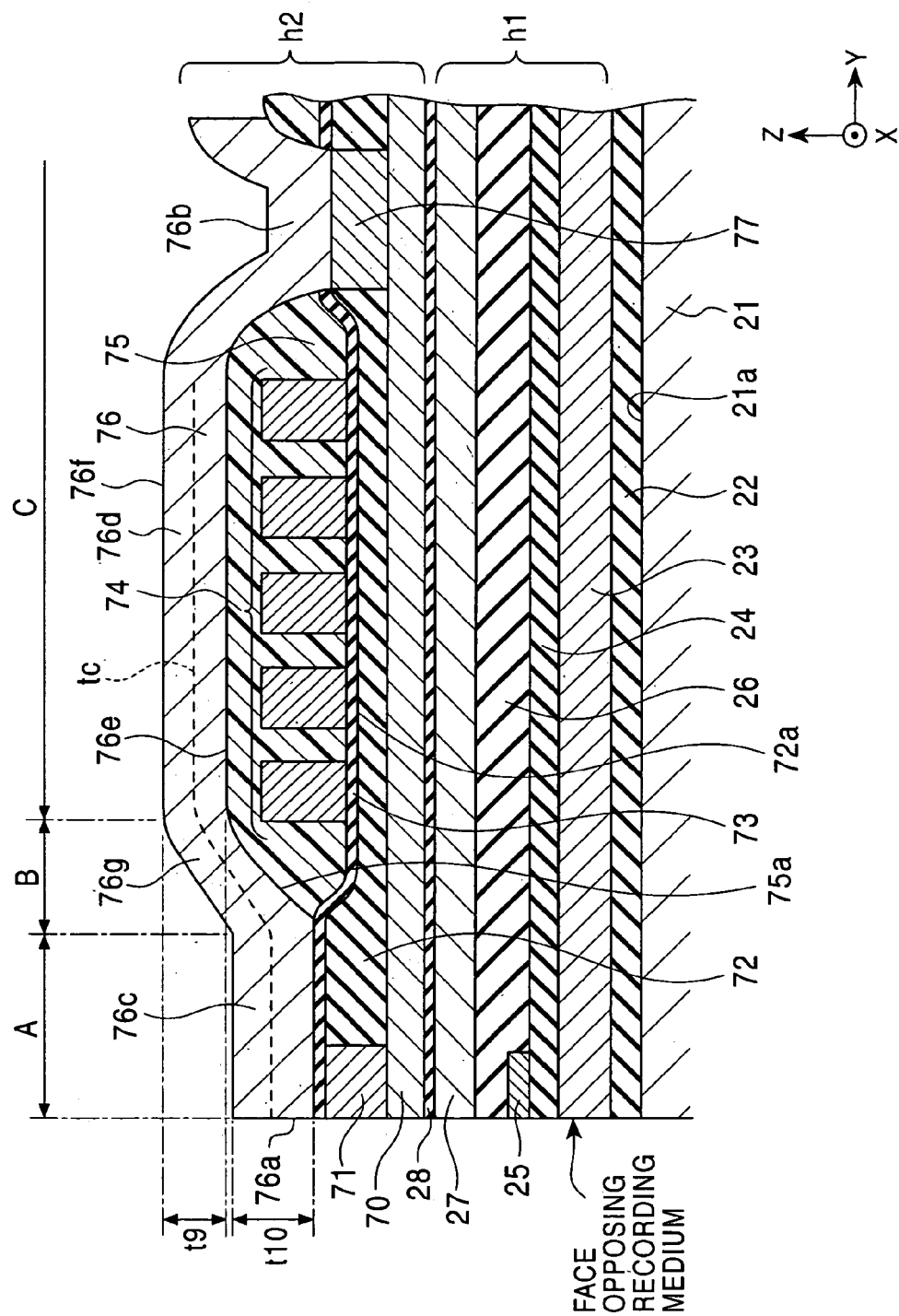
FIG. 7 is a sectional view of a magnetic head in accordance with a fourth preferred embodiment of the present invention.

FIG. 7 is a sectional view of a magnetic head in accordance with a fourth preferred embodiment of the present invention.

An MR head h1 of the fourth embodiment is identical in structure to the MR head h1 shown in FIG. 1. A lower magnetic pole layer 71, disposed on a lower core layer 70, extends from a face opposing a recording medium in the magnetic head shown in FIG. 7. An insulating layer 72, made of an inorganic material, is disposed behind the lower magnetic pole layer 71 in a height direction (in the Y direction as shown). The insulating layer 72 has a recessed coil receiving surface 72a.

A gap layer 73, made of a non-magnetic material, is disposed on the lower magnetic pole layer 71 and the insulating layer 72. A coil layer 74 is disposed on the gap layer 73 above the coil receiving surface 72a of the insulating layer 72. The coil layer 74 is covered with an insulating layer 75 made of an organic insulating material.

An upper core layer 76 is laminated on a top portion of the insulating layer 75 and the insulating layer 75. A base portion 76b of the upper core layer 76 is magnetically coupled to the lower core layer 70 through a support layer 77 made of a magnetic material and disposed on the lower core layer 70.

The upper core layer 76 is made of an FeNiX alloy (X is an element of one of rhenium Re and molybdenum Mo). The upper core layer 76 has a lower surface 76e facing the lower core layer 70 and an upper surface 76f opposed from the lower surface 76e. The upper core layer 76 includes a rising portion 76g that gradually rises from the face opposing the recording medium while extending toward a deeper side of the head (in the Y direction as shown) with the lower surface 76e and the upper surface 59f gradually parting away from the lower core layer 70, and a core leading portion 76c where the lower surface 76e and the upper surface 76f extend in parallel with the lower core layer 70. The upper core layer 76 has a yoke structure.

As shown in FIG. 7, an intermediate section B of the upper core layer 76 is laminated on a slope surface 75a. A portion of a front section A and a portion of a rear section C of the upper core layer 76 may be disposed on the slope surface 75a.

Let tc represent a thickness center that extends at a half-thickness level of the thickness of the upper core layer 76 between the lower surface 76e and the upper surface 76f in each of the core leading portion 76c and the rising portion 76g of the upper core layer 76 with the thickness being along a direction of line normal to the lower surface 76e, and let a concentration difference of the upper core layer 76 be defined by a difference (a concentration of iron by weight percent minus a concentration of the element X by weight percent). In one of the core leading portion 76c and the rising portion 76g, the concentration difference is smaller at a backward position at the thickness center tc than at a frontward position at the thickness center tc more frontward than the backward position.

In the magnetic head of the fourth preferred embodiment of the present invention, the saturation magnetic flux density Bs of the upper core layer 76 is set to be smaller at the backward position at the thickness center tc than at the frontward position at the thickness center tc. The specific resistance ρ of the upper core layer 76 is set to be larger at the backward position at the thickness center tc than at the frontward position at the thickness center tc in one of the core leading portion 76c and the rising portion 76g.

Even if the upper core layer 76 has a single layer structure, the concentration difference of the FeNiX alloy between the concentration of iron by weight percent and the concentration of the element X by weight percent of the upper core layer 76 made of the FeNiX alloy is varied within the upper core layer 76. The upper core layer 76 is free from a disturbance in the flow of magnetic flux, which is experienced in the known upper core layer formed of a plurality magnetic layers of different magnetic materials.

For example, the frontward position is at the leading edge 76a opposing the recording medium, and the backward position is at an apex 76d where the upper surface 76f is spaced farthest apart from the lower core layer 70 in the rising portion 76g.

The absolute value of the saturation magnetic flux density Bs of the upper core layer 76 at the frontward position is increased by setting the concentration of iron by weight percent of the upper core layer 76 to be smaller at the backward position at the thickness center tc than at the frontward position at the thickness center tc in one of the core leading portion 76c and the rising portion 76g.

Preferably, the concentration of the element X by weight percent of the upper core layer 76 is larger at the backward position at the thickness center tc than at any frontward position at the thickness center tc in one of the core leading portion 76c and the rising portion 76g.

The concentration difference of the FeNiX alloy between the concentration of iron by weight percent and the concentration of the element X by weight percent of the upper core layer 76 is smaller at an upper position than at a lower position where the lower position is any point in one of the core leading portion 76c and the rising portion 76g and the upper position is any point that is closer to the upper surface 76f than the lower position in the one of the core leading portion 76c and the rising portion 76g.

The concentration of iron of the FeNiX alloy by weight percent is high at the lower position, causing the saturation magnetic flux density Bs to be increased. The concentration of the element X of the FeNiX alloy by weight percent is high at the upper position, increasing the specific resistance ρ and decreasing the saturation magnetic flux density Bs.

More specifically, the saturation magnetic flux density Bs becomes high at the lower surface 76e of the upper core layer 76 closer to the coil layer, namely, in a portion of the shortest magnetic path in the upper core layer 76 of the magnetic head. The overwrite characteristics of the magnetic head are improved. The magnetic head thus accommodates a frequency shift of a recording signal to a higher frequency range by increasing the specific resistance ρ on and in the vicinity of the upper surface 76f of the upper core layer 76.

The lower position lies in the lower surface 76e of the upper core layer 76, and the upper position lies in the upper surface 76f of the lower core layer 76.

The concentration difference is preferably gradually varied from the lower position to the upper position in one of the core leading portion 76c and the rising portion 76g. Even if the upper core layer 76 has a single layer structure, the concentration difference of the FeNiX alloy between the concentration of iron by weight percent and the concentration of the element X by weight percent of the upper core layer 76 made of the FeNiX alloy is varied within the upper core layer 76. The upper core layer 76 is free from a disturbance in the flow of magnetic flux, which is experienced in the known upper core layer formed of a plurality magnetic layers of different magnetic materials.

Preferably, the thickness t9 of the upper core layer 76 at the apex 76d where the upper surface 76f is spaced farthest apart from the lower core layer 70 is smaller than the thickness t10 of the upper core layer 76 at the leading edge 76a opposing the recording medium.

The arrangement of the upper core layer 76 with the thickness t9 at the apex 76d thereof smaller than the thickness t10 at the leading edge 76a thereof advantageously increases the resistance of the upper core layer 76.

In the magnetic heads illustrated in FIGS. 4 through 7, the concentration difference is preferably gradually varied from the frontward position to the backward position along the center line that extends at the thickness center tc from the opposing side to the deeper side of the magnetic disk.

In this arrangement, the saturation magnetic flux density Bs in each of the upper core layers 59, 65, and 75 continuously increases toward the frontward position.

The concentration of iron by weight percent is preferably gradually varied from the frontward position to the backward position along the center line that extends at the thickness center tc from the opposing side to the deeper side of the magnetic head. The concentration of the element X is preferably gradually varied from the frontward position to the backward position along the center line.

In each of the preferred embodiments, the lower core layer and the upper shield layer are separate layers. A single magnetic film layer may be commonly used for the lower core layer and the upper shield layer.

A typical method for manufacturing each of the magnetic heads illustrated in FIGS. 1 through 7 is discussed below.

The manufacturing method of the magnetic head illustrated in FIGS. 1 through 3 is discussed first. The Gd determining layer 31 is deposited on the lower core layer 30. The magnetic pole section 32, composed of the lower magnetic pole layer 33, the non-magnetic gap layer 34, and the upper magnetic pole layer 35 is deposited and extended in the height direction from the face opposing the recording medium using a resist through a continuous plating technique.

The lower layer portion of the coil layer 38 is plated in a spiral form in the height direction behind the magnetic pole section 32 after depositing the insulating layer 37 made of an inorganic material, such as aluminum oxide ($Al_2O_3$) or silicon dioxide ($SiO_2$). The insulating layer 37b, made of an inorganic material, is then deposited. Using the chemical-mechanical polishing (CMP) technique, the top surface of the magnetic pole section 32 and the top surface of the insulating layer 37b are planarized at the same flat plane.

The insulating layer 39 is deposited on the coil layer 38 after the upper layer portion of the coil layer 38 is plated on the insulator 37 in a spiral form. The insulating layer 39 has the slope surface 39a on the front side thereof.

The upper core layer 36 is provided on the magnetic pole section 32 and the insulating layer 39 using the frame plating technique, for example.

The manufacturing method of the magnetic head illustrated in FIGS. 4 and 5 will now be discussed. After depositing the insulating layer 51 on the lower core layer 50, the track width forming slit 51a extending in the height direction from the face opposing the recording medium is formed in the insulating layer 51 using a resist. By cutting the corners of the track width forming slit 51a using an ion milling technique, the slope surfaces 51c are formed in the track width forming slit 51a.

The lower magnetic pole layer 53 and the gap layer 54 are disposed within the track width forming slit 51a. After extending the Gd determining layer 56 from the gap layer 54 and over to the insulating layer 51, the gap layer 54 is plated with the upper magnetic pole layer 55. The insulating layer 58 is then deposited on the coil layer 57 after the coil layer 57 is patterned in a spiral form on the insulating layer 51. The coil insulating layer 58 has the slope surface 58a on the front side thereof. The upper core layer 59 is deposited on the upper magnetic pole layer 55 and the insulating layer 58 using the frame plating technique.

The manufacturing method of the magnetic head illustrated in FIG., 6 will now be discussed. The gap layer 61 is disposed on the lower core layer 60. The coil layer 63 is plated on the insulating layer 62 after the insulating layer 62 is deposited. The insulating layer 64 is disposed on the coil layer 63. The insulating layer 64 has the slope surface 64a on the front side thereof. The upper core layer 65 is patterned on the gap layer 61 and the insulating layer 64 using the frame plating technique.

The manufacturing method of the magnetic head illustrated in FIG. 7 will now be discussed. The lower magnetic pole layer 71 is deposited on the lower core layer 70. The insulating layer 72 is deposited behind the lower magnetic pole layer 71, extending in the height direction. After the top surfaces of the lower magnetic pole layer 71 and the insulating layer 72 are planarized using the CMP technique, the recessed coil receiving surface 72a is formed in the insulating layer 72. The gap layer 73, made of the non-magnetic material, is provided on the lower magnetic pole layer 71 and the insulating layer 72. The coil layer 74 is patterned in a spiral form on the gap layer 73. The insulating layer 75 is deposited on the coil layer 74. The insulating layer 75 has the slope surface 75a on the front side thereof. The upper core layer 76 is patterned on the gap layer 73 and the insulating layer 75 using the frame plating technique.

The method of manufacturing an upper core layer, such as the upper core layer 36 of the magnetic head illustrated in FIGS. 1 through 3, is discussed here. The method of manufacturing the upper core layer of each of the magnetic heads illustrated in FIGS. 4 through 7 remains unchanged from the manufacturing method of the upper core layer 36.

The upper core layer 36 is formed by electroplating an FeNiX (X is an element of one of rhenium Re and molybdenum. Mo) with a pulse current. To dispose the upper core layer 36 in the magnetic head of the first preferred embodiment of the present invention, conditions, such as parameters of plating bath, pulse current, and a film forming rate in particular, are important. Specific values of these parameters will be discussed later.

The upper core layer 36 is formed to an any desired thickness by electroplating the FeNiX alloy. The plating technique provides a thicker layer than the sputtering technique.

In the magnetic head illustrated in FIGS. 1 through 3, the concentrations of the FeNiX alloy vary within the upper core layer 36. The following mechanism is considered to work.

The upper core layer 36 is deposited on the upper magnetic pole layer 35 and the slope surface 39a of the insulating layer 39 formed on the side opposing the recording medium in the magnetic head illustrated in FIGS. 1 through 3. The rising portion 36g is formed to rise from the face opposing the recording medium to the deeper side in the magnetic head with the lower surface 36e and the upper surface 36f gradually parting away from the lower core layer 30.

As shown in FIG. 2, the rear section C of the upper core layer 36 is positioned above the rising portion 36g, and the front section A of the upper core layer 36 is positioned below the rising portion 36g. The track width dimension W2 and the dimension in the height direction (the Y direction) of the rear section C of the upper core layer 36 are respectively larger than the track width dimension W1 and, the dimension in the height direction of the front section A. In other words, the area of the rear section C of the upper core layer 36 is larger than the area of the front section A in the XY plane.

A concentration of the element X by weight percent in the FeNiX alloy (X is an element of one of rhenium Re and molybdenum Mo) forming the upper core layer 36, substantially smaller than the concentrations of Fe and Ni by weight percent, is acceptable. The concentration of the element X of the FeNiX alloy in a plating bath is as small as about one-fortieth the concentration of iron.

The element X in the plating solution is high in concentration in the rear section C having a large area above the rising portion 36g, and low in concentration in the front section A having a small area below the rising portion 36g. As a result, the concentration of the element X by weight percent in the rear section C is larger than the concentration of the element X by weight percent in the front section A in the upper core layer 36.

It is known that, given the same magnitude of film forming current, a film forming rate during plating of the FeNiX alloy (the thickness of the film formed per unit time) is lower than a film forming rate of an NiFe alloy less the element X.

During the plating process of the upper core layer 36 of the FeNiX alloy, the film forming rate is low in the rear section C having a higher element X concentration while the film forming rate is high in the front section A having a lower element X concentration. If the film forming rate is high, the supply of iron ions is unable to keep pace with a consumption rate (film forming rate) of a plating solution in the front section A. It becomes difficult to raise the concentration of iron by weight percent in the FeNiX alloy in the front section A.

If the mean value of the film forming rate of the upper core layer 36 is reduced, the front section A is continuously supplied with iron ions at a sufficient quantity. The concentration of iron per weight percent in the front section A is increased.

During the plating process of the upper core layer 36, the concentration of rhenium in the plating bath is adjusted and the mean film forming rate is adjusted (for a lower rate). The concentration difference of the upper core layer 36 between the concentration of iron by weight percent and the concentration of the element X by weight percent is set to be smaller at the backward position at the thickness center tc than at the frontward position at the thickness center tc more frontward than the backward position in one of the core leading portion 36c and the rising portion 36g.

In the magnetic head of the first preferred embodiment of the present invention, the saturation magnetic flux density Bs of the upper core layer 36 is set to be smaller at the backward position at the thickness center tc than at the frontward position at the thickness center tc. The specific resistance $\rho$ of the upper core layer 36 is set to be larger at the backward position at the thickness center tc than at the frontward position at the thickness center tc in one of the core leading portion 36c and the rising portion 36g.

Without the need for changing the plating solution, the concentration difference of the FeNiX alloy forming the upper core layer 36 between the concentration of iron by weight percent and the concentration of the element X by weight percent is varied within the upper core layer 36. The upper core layer 36 is manufactured as a single layer structure, and is free from a disturbance in the flow of magnetic flux, which is experienced in the known upper core layer formed of a plurality magnetic layers of different magnetic materials.

The concentration difference is gradually varied from the frontward position to the backward position along the center line that extends at the thickness center tc from the opposing side to the deeper side of the magnetic head.

By adjusting the mean film forming rate in the plating process of the upper core layer 36, the concentration of iron of the upper core layer 36 by weight percent is set to be smaller at the backward position at the thickness center tc than at the frontward position at the thickness center tc. The absolute value of the saturation magnetic flux density Bs at the frontward position in the upper core layer 36 is thus increased.

By adjusting the mean film forming rate, the concentration of iron by weight percent is gradually varied from the frontward position to the backward position along the center line that extends at the thickness center from the face opposing the recording medium to the deeper side of the upper core layer 36.

The concentration of the element X (the element X is one of rhenium Re and molybdenum Mo) by weight percent in the upper core layer 36 is smaller at the backward position at the thickness center than at the frontward position at the thickness center. The absolute value of the saturation magnetic flux density Bs at the frontward position in the upper core layer 36 is increased.

By adjusting the mean film forming rate, the concentration of the element X is gradually varied from the frontward position to the backward position along the center line that extends at the thickness center from the face opposing the recording medium to the deeper side of the upper core layer 36.

During the plating process of the upper core layer 36 made of the FeNiX alloy, the film forming rate is low in the rear section C having a high element X concentration while the film forming rate is high in the front section A having a low element X concentration. The thickness t3 at the apex 36d of the upper core layer 36 is set to be smaller than the thickness t4 at the leading edge of the upper core layer 36. More specifically, resistance is increased by thinning a portion of the upper core layer 36 away from the leading edge 36a to reduce the eddy current loss. The thickness of the upper core layer 36 at and in the vicinity of the leading edge 36a, greatly affecting the recording characteristics, is not reduced. The apex 36d of the upper core layer 36 is a point of the upper core layer 36 positioned at the highest level in the Z direction.

The concentration difference of the FeNiX alloy between the concentration of iron by weight percent and the concentration of the element X by weight percent of the upper core layer 36 is smaller at an upper position than at a lower position where the lower position is any point in one of the core leading portion 36c and the rising portion 36g and the upper position is any point that is closer to the upper surface 36f than the lower position in the one of the core leading portion 36c and the rising portion 36g.

The concentration of iron of the FeNiX alloy by weight percent is high at the lower position, causing the saturation magnetic flux density Bs to be increased. The concentration of the element X of the FeNiX alloy by weight percent is high at the upper position, increasing the specific resistance $\rho$ and decreasing the saturation magnetic flux density Bs.

More specifically, the saturation magnetic flux density Bs becomes high at the lower surface 36e of the upper core layer 36 closer to the coil layer 38, namely, in a portion of the shortest magnetic path in the upper core layer 36 of the magnetic head. The overwrite characteristics of the magnetic head are improved. The magnetic head accommodates a frequency shift of a recording signal to a higher frequency range by increasing the specific resistance $\rho$ on and in the vicinity of the upper surface 36f of the upper core layer 36.

EXAMPLES

The magnetic head illustrated in FIGS. 1 through 3 was manufactured. The upper core layer 36 of the magnetic head is a plating of the FeNiRe alloy.

Table 1 lists the concentrations of the elements of the plating bath of the FeNiRe alloy that forms the upper core layer 36.

TABLE 1

Figure 8:
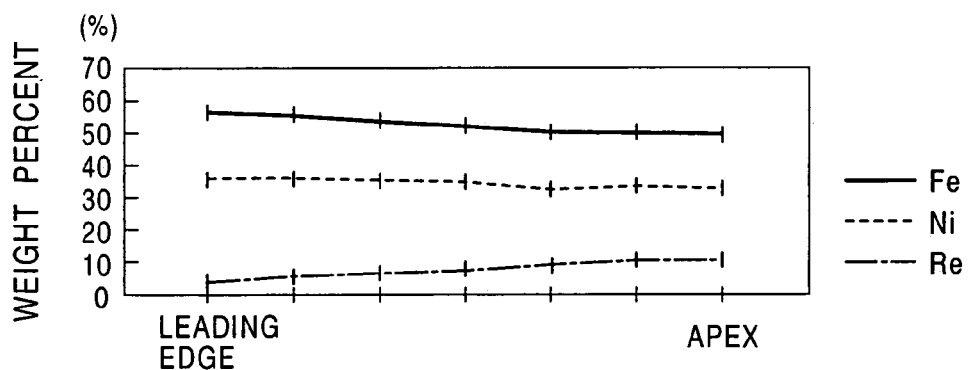
FIG. 8 is a graph plotting the relationship between the distance from a leading edge of the upper core layer and the concentrations of elements of the upper core layer of the magnetic head of preferred embodiments of the present invention.
Figure 9:
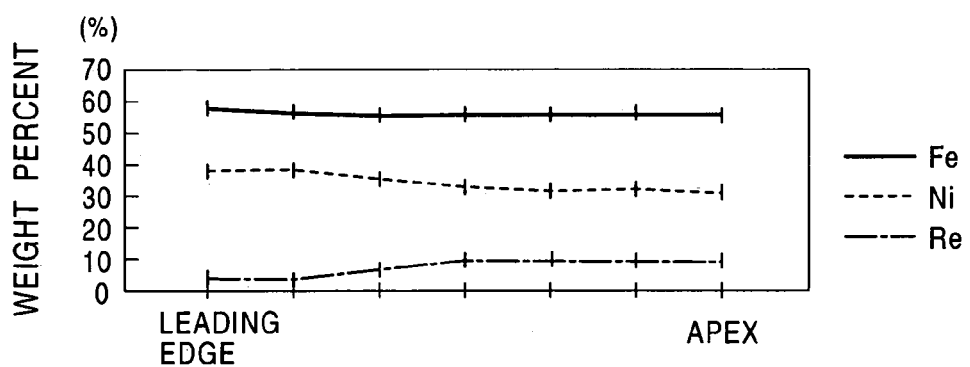
FIG. 9 is a graph plotting the relationship between the distance from the leading edge of the upper core layer and the concentrations of the elements of the upper core layer of the magnetic head of the preferred embodiments of the present invention.
Figure 10:
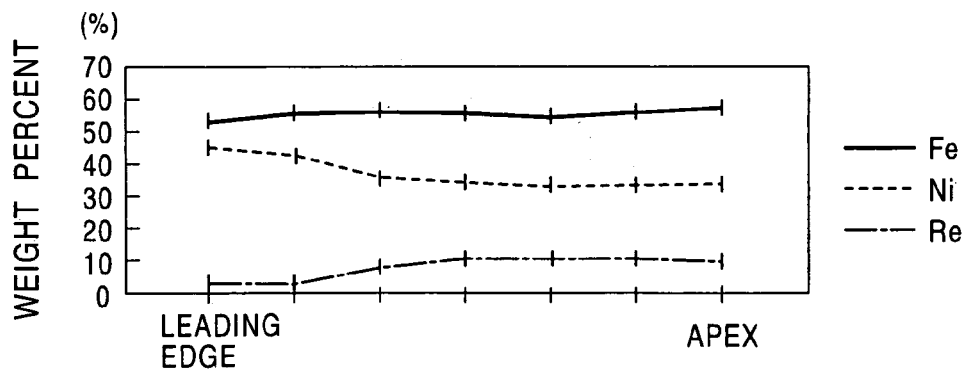
FIG. 10 is a graph plotting the relationship between the distance from the leading edge of the upper core layer and the concentrations of the elements of the upper core layer of the magnetic head of the preferred embodiments of the present invention.
Figure 11:
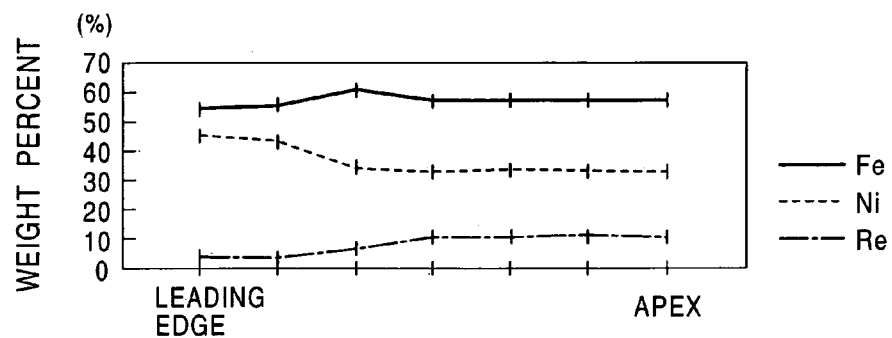
FIG. 11 is a graph plotting the relationship between the distance from the leading edge of the upper core layer and the concentrations of the elements of the upper core layer of the magnetic head of the preferred embodiments of the present invention.

| FeNiRe | FIG. 8 | FIG. 9 | FIG. 10 | FIG. 11 |
| --- | --- | --- | --- | --- |
| Fe ion concent. (g/l) | 1.8 | 2.7 | 1.2 | 2.3 |
| Ni ion concent. (g/l) | 10 | 10 | 10 | 10 |
| Fe/Ni ion ratio | 0.18 | 0.27 | 0.12 | 0.23 |
| Re ion concent. (g/l) | 0.03 | 0.04 | 0.03 | 0.04 |
| Boric acid concent. (g/l) | 25 | 25 | 25 | 25 |
| NaCl concent. (g/l) | 25 | 25 | 25 | 25 |
| Sodium saccharate concent. (g/l) | 2.0 | 2.0 | 2.0 | 2.0 |
| Actual current density (mA/m$^2$) | 16 | 15 | 25 | 9 |

In this test, a plating bath was set within a temperature range of 25 to 30° C., and the pH level of the plating bath was set to be within a range of 3.0 to 4.0. A nickel electrode was used for the anode electrode in the plating process.

In this example, the FeNiRe alloy was electroplated using a direct current or a pulse current.

The pulse current is preferred. In the electroplating process using the pulse current, a current control element repeats on and off operations to cause a current to flow during one period and to stop the current during the other period. Within no current flowing periods allowed, the FeNiRe alloy is gradually plated, thereby improving a localized distribution of current density during the plating process than an electroplating process using a direct current. The electroplating process using the pulse current allows the concentration of iron contained in the soft magnetic material to be adjusted more easier than the electroplating process using the direct current. A larger content of iron is captured into the upper core layer 36.

The nickel ion concentration of the plating bath to be used in the manufacture of the soft magnetic material film of the present invention is as low as about 10 g/l. During the plating process, the content of nickel in the plating solution in contact with the surface of a cathode (a material to be plated) relatively decreases, and agitating effect becomes more pronounced, thereby allowing irons to be captured into the upper core layer 36. With the agitating effect improved, iron ions are appropriately supplied, leading to a compact crystal.

Sodium saccharate ($C_6H_4CONNaSO_2$) was mixed into the plating bath of the FeNiRe alloy in this example. Since sodium saccharate functions as a stress relaxation agent, a film stress in the plating of the FeNiRe alloy is reduced.

2-Butyne-1,4-diol, if mixed into the plating bath of the FeNiRe alloy, controls an enlargement in the particle size of crystals of the FeNiRe alloy, and reduces a coercive force Hc.

Sodium 2-ethylhexyl sulfate as a surface active agent, if mixed into the plating bath of FeNiRe alloy, removes hydrogen generated during the plating process of the FeNiRe alloy. The adhering of hydrogen to the plating is prevented. Hydrogen adhering to the plating impedes the compact crystallization of the alloy, thereby leading to a rough surface of the plating. Since hydrogen is removed in this example, the surface roughness of the plating is fined, and the coercive force Hc is reduced.

Sodium laureth sulfate may be used instead of sodium 2-ethylhexyl sulfate. In comparison with sodium 2-ethylhexyl sulfate, sodium laureth sulfate tends to be frothy when it is mixed into the plating bath. It is difficult to mix sodium laureth sulfate into the plating bath to the degree that hydrogen is effectively removed. Preferably, sodium 2-ethylhexyl sulfate, which is less frothy than sodium laureth sulfate, is more easily mixed into the plating bath to the degree that hydrogen is effectively removed.

Boric acid, if mixed into the plating bath, becomes a pH relaxation agent on the electrode surface, and is effective in increasing the glossiness of the plating.

As illustrated in FIG. 2, the plating of the upper core layer 36 having the rising portion 36g has a yoke structure.

FIGS. 8 through 11 plot measured concentrations of elements of the FeNiRe alloy of the upper core layer 36 from the leading edge 36a as the face opposing the recording medium to the apex 36d where the upper surface 36f is spaced farthest apart from the lower core layer 30. Specimens were taken along the center line that extends at the thickness center tc, namely, a half-thickness level of the thickness between the lower surface 36e and the upper surface 36f from the face opposing the recording medium to the deeper side (the center line represented by a dotted line in FIG. 2). Here the thickness is considered along a direction of line N normal to the lower surface 36e.

FIGS. 8 through 10 plot the concentrations of the alloy that were obtained when the plating process of the upper core layer 36 was performed using a pulse current having a ON/OFF duty factor of 300/700 ms. FIG. 11 plots the concentrations of the alloy that were obtained when the plating process of the upper core layer 36 was performed using a direct current.

The mean film forming rate during the plating process of the upper core layer 36 is different from FIG. 8 to FIG. 9 to FIG. 10. FIG. 8 plots the concentration results with the mean film forming rate of the upper core layer 36 at 0.071 μm/minute. FIGS. 9 and 10 respectively plot the concentration results with the mean film forming rates of the upper core layer 36 at 0.097 μm/minute and at 0.168 μm/minute. The film forming rate of the upper core layer 36 is 0.163 μm/minute in FIG. 11.

Since the film forming rate in the vicinity of the leading edge 36a is different from the film forming rate of the upper core layer 36 near the apex thereof during the plating process of the upper core layer 36, the mean film forming rate is an average of the film forming rate at the leading edge 36a and the film forming rate at the apex 36d.

Referring to FIGS. 8 through 10, the concentration of rhenium of the FeNiRe alloy by weight percent continuously increases from the leading edge 36a of the upper core layer 36 deeper to the backward position while the concentration of iron of the FeNiRe alloy by weight percent is slightly varied from the leading edge 36a to the backward position. If the mean film forming rate of the upper core layer 36 becomes low, the concentration of iron by weight percent tends to be lower at the backward position.

The concentration difference, between the concentration of iron by weight percent and the concentration of rhenium bey weight percent, at the leading edge 36a of the upper core layer 36 is larger than the concentration, difference between the concentration of iron by weight percent and the concentration of rhenium by weight percent, at a backward position more backward from the leading edge 36a of the upper core layer 36. In particular, the concentration difference, between the concentration of iron by weight percent and the concentration of rhenium by weight percent, at the leading edge 36a of the upper core layer 36 is larger than the concentration difference, between the concentration of iron by weight percent and the concentration of rhenium by weight percent, at the apex 36d of the upper core layer 36.

In the FeNiRe alloy, the magnetism of iron is attributed to the 3d electrons thereof. As the concentration of iron in the alloy increases, the saturation magnetic flux density Bs increases. As the concentration of rhenium in the FeNiX alloy increases, a specific resistance ρ of the alloy is heightened.

As the concentration difference between the concentration of iron by weight percent and the concentration of rhenium by weight percent, the concentration of iron increases, thereby heightening the saturation magnetic flux density Bs. As the concentration difference between the concentration of iron by weight percent and the concentration of rhenium by weight percent, the concentration of rhenium increases, thereby heightening the specific resistance ρ and decreasing the saturation magnetic flux density Bs.

In the upper core layer 36 of the magnetic head of the first preferred embodiment of the present invention, the saturation magnetic flux density Bs is large in a region closer to the leading edge 36a of the upper core layer 36 while the specific resistance ρ is large in a region spared apart from the leading edge 36a of the upper core layer 36. The present invention improves the overwrite characteristics and accommodates a frequency shift of a recording signal into a high frequency range.

The concentration difference at the leading edge 36a between the concentration of iron by weight percent and the concentration of rhenium by weight percent is 48.6% because the concentration of iron by weight percent at the leading edge 36a is 58.9%, and the concentration of rhenium by weight percent at the leading edge 36a is 3.8% as shown in FIG. 8.

The concentration difference at the apex 36d between the concentration of iron by weight percent and the concentration of rhenium by weight percent is 39.2% because the concentration of iron by weight percent at the apex 36d is 52.2%, and the concentration of rhenium by weight percent at the apex 36d is 13.0% as shown in FIG. 8.

The concentration difference at the leading edge 36a between the concentration of iron by weight percent and the concentration of rhenium by weight percent is 54.2% because the concentration of iron by weight percent is 57.7%, and the concentration of rhenium by weight percent is 3.5% as shown in FIG. 9. The concentration difference at the apex 36d between the concentration of iron by weight percent and the concentration of rhenium by weight percent is 48.7% because the concentration of iron by weight percent is 58.3%, and the concentration of rhenium by weight percent is 9.6% as shown in FIG. 9.

The concentration difference at the leading edge 36a between the concentration of iron by weight percent and the concentration of rhenium by weight percent is 48.6% because the concentration of iron by weight percent is 52.1%, and the concentration of rhenium by weight percent is 3.5% as shown in FIG. 10. The concentration difference at the apex 36d between the concentration of iron by weight percent and the concentration of rhenium by weight percent is 47.4% because the concentration of iron by weight percent is 57.3%, and the concentration of rhenium by weight percent is 9.9% as shown in FIG. 10.

The concentration difference at the leading edge 36a between the concentration of iron by weight percent and the concentration of rhenium by weight percent is 49.6% because the concentration of iron by weight percent is 52.7%, and the concentration of rhenium by weight percent is 3.1% as shown in FIG. 11. The concentration difference at the apex 36d between the concentration of iron by weight percent and the concentration of rhenium by weight percent is 46.2% because the concentration of iron by weight percent is 56.7%, and the concentration of rhenium by weight percent is 10.5% as shown in FIG. 11.

Referring to FIG. 8 where the mean film forming rate of the upper core layer 36 is lowest, the concentration of iron by weight percent at the leading edge 36a is larger than the concentration of iron by weight percent at any point more backward than the leading edge 36a of the upper core layer 36. The concentration of iron by weight percent is continuously reduced with the distance in the height direction from the leading edge 36a of the upper core layer 36.

Figure 12:
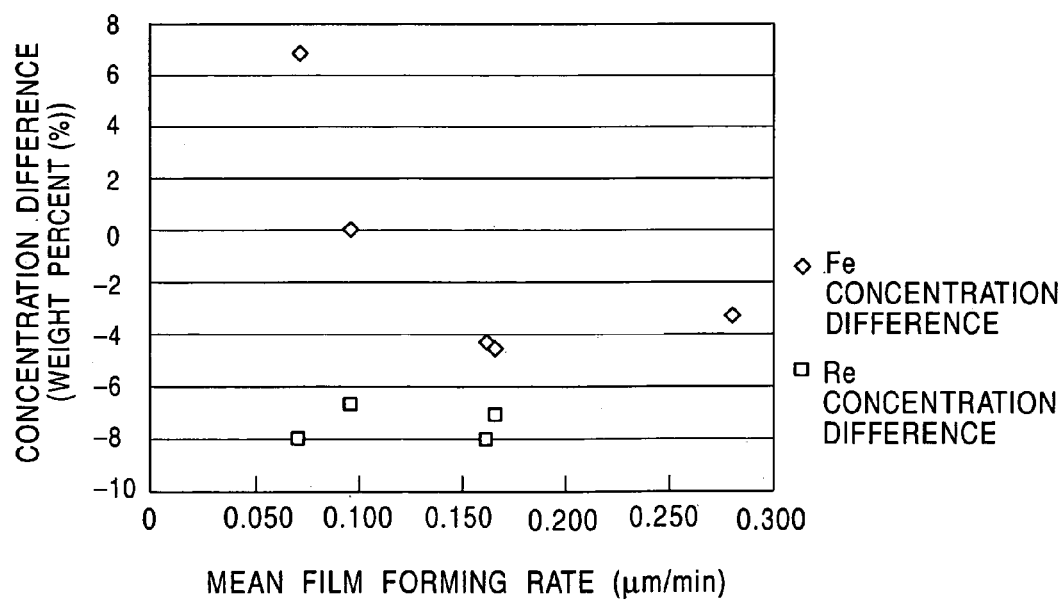
FIG. 12 is a graph plotting the relationship of a film forming rate of the upper core layer, iron concentration difference and rhenium concentration difference of the upper core layer from a leading edge to an apex of the magnetic head of the preferred embodiments of the present invention.

FIG. 12 plots data derived from the data plotted in FIGS. 8 through 11. In other words, FIG. 12 shows the relationship between the mean film forming rate of the upper core layer 36 and the concentration difference between the concentration of iron by weight percent at the leading edge 36a and the concentration of iron by weight percent at the apex 36d in the upper core layer 36, and the relationship between the mean film forming rate of the upper core layer 36 and the concentration difference between the concentration of rhenium by weight percent at the leading edge 36a and the concentration of rhenium by weight percent at the apex 36d in the upper core layer 36.

As shown, the concentration difference of iron by weight percent between the leading edge 36a and the apex 36d is 6.9% with the mean film forming rate of the upper core layer 36 at 0.071 µm/minute (FIG. 8). The concentration difference of iron by weight percent between the leading edge 36a and the apex 36d is 0% with the mean film forming rate of the upper core layer 36 at 0.097 µm/minute (FIG. 9). The concentration difference of iron by weight percent between the leading edge 36a and the apex 36d is −4.1% with the mean film forming rate of the upper core layer 36 at 0.163 µm/minute (FIG. 11). The concentration difference of iron by weight percent between the leading edge 36a and the apex 36d is −4.6% with the mean film forming rate of the upper core layer 36 at 0.168 µm/minute (FIG. 10).

The concentration difference of rhenium by weight percent between the leading edge 36a and the apex 36d is −8.0% with the mean film forming rate of the upper core layer 36 at 0.071 µm/minute (FIG. 8). The concentration difference of rhenium by weight percent between the leading edge 36a and the apex 36d is −6.7% with the mean film forming rate of the upper core layer 36 at 0.097 µm/minute (FIG. 9). The concentration difference of rhenium by weight percent between the leading edge 36a and the apex 36d is −8.0% with the mean film forming rate of the upper core layer 36 at 0.163 µm/minute (FIG. 11). The concentration difference of rhenium by weight percent between the leading edge 36a and the apex 36d is −7.1% with the mean film forming rate of the upper core layer 36 at 0.168 µm/minute (FIG. 10).

If the mean film forming rate is low, the concentration difference of iron by weight percent between the leading edge 36a and the apex 36d in the upper core layer 36 increases, but the concentration difference of rhenium by weight percent between the leading edge 36a and the apex 36d in the upper core layer 36 is small.

The concentrations of the elements of the FeNiRe alloy are considered to vary within the upper core layer 36 in the following mechanism.

The upper core layer 36 covers the upper magnetic pole layer 35 and the slope surface 39a of the insulating layer 39 opposing the recording medium in the magnetic head shown in FIGS. 1 through 3. The upper core layer 36 includes the rising portion 36g in the yoke structure.

As shown in FIG. 2, the rear section C of the upper core layer 36 is positioned above the rising portion 36g, and the front section A of the upper core layer 36 is positioned below the rising portion 36g. The track width dimension W2 and the dimension in the height direction (the Y direction) of the rear section C of the upper core layer 36 are respectively larger than the track width dimension W1 and the dimension in the height direction of the front section A. In other words, the area of the rear section C of the upper core layer 36 is larger than the area of the front section A in the XY plane.

A concentration of the element X by weight percent in the FeNiX alloy (X is an element of rhenium Re or molybdenum Mo) forming the upper core layer 36, substantially smaller than the concentrations of Fe and Ni by weight percent, is acceptable. The concentration of the element X of the FeNiX alloy in a plating bath is as small as about one-fortieth the concentration of iron.

The element X in the plating solution is high in concentration in the rear section C having a large area above the rising portion 36g, and low in concentration in the front section A having a small area below the rising portion 36g. As a result, the concentration of the element X by weight percent in the rear section C is larger than the concentration of the element X by weight percent in the front section A in the upper core layer 36.

Given the same magnitude of film forming current, a film forming rate during plating of the FeNiRe alloy (the thickness of the film formed per unit time) is lower than a film forming rate of an NiFe alloy less rhenium.

Figure 13:
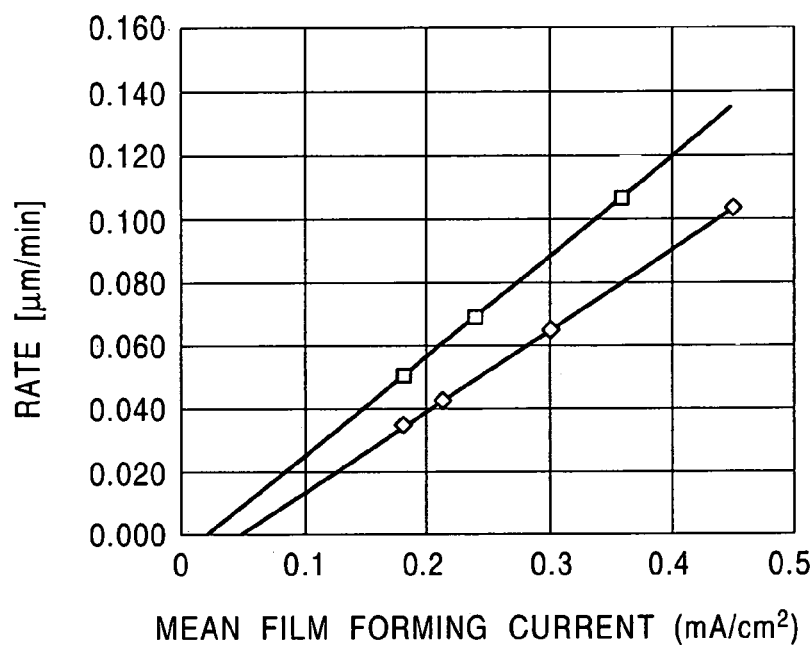
FIG. 13 is a graph plotting the relationship between the magnitude of a film forming current and a film forming rate of the upper core layer.

FIG. 13 is a graph plotting the relationship between the magnitude of the film forming current and the film forming rate during the plating of an NiFe alloy and an FeNiRe alloy. The plating process was performed using a pulse current having an ON/OFF duty factor of 300/700 ms. The film forming current on the abscissa in FIG. 13 represents a mean current per ms. The film forming rate represents a thickness of film formed per minute.

Referring to FIG. 13, square symbols represent results of the plating process of an NiFe alloy, and diamond symbols represent results of the plating process of an FeNiRe alloy.

The graph in FIG. 13 shows that the magnitude of the film forming current is proportional to the film forming rate in each of the NiFe alloy and the FeNiRe alloy during the plating process.

The gradient of the plot is smaller in the FeNiRe alloy than in the NiFe alloy. More specifically, given the same magnitude of film forming current, the film forming rate becomes low if rhenium is contained.

During the plating process of the upper core layer 36 of the FeNiRe alloy, the film forming rate is low in the rear section C having a higher rhenium concentration while the film forming rate is high in the front section A having a lower rhenium concentration. If the film forming rate is high, the supply of iron ions is unable to keep pace with a consumption rate (film forming rate) of a plating solution in the front section A. It becomes difficult to raise the concentration of iron by weight percent in the FeNiRe alloy in the front section A.

If the mean value of the film forming rate of the upper core layer 36 is reduced, the front section A is continuously supplied with iron ions at a sufficient quantity. The concentration of iron per weight percent in the front section A is increased.

By adjusting the mean film forming rate in the plating process of the upper core layer 36, the concentration of iron by weight percent at the leading edge 36a of the upper core layer 36 is set to be larger than the concentration of iron by weight percent at a backward position more backward from the leading edge 36a of the upper core layer 36. The absolute value of the saturation magnetic flux density Bs at the leading edge 36a of the upper core layer 36 is heightened.

By adjusting the mean film forming rate, the concentration of iron by weight percent of the upper core layer 36 is gradually decreased with the distance from the leading edge 36a of the upper core layer 36 toward the yoke-shaped apex 36d.

The concentration of rhenium of the upper core layer 36 by weight percent at the leading edge 36a of the upper core layer 36 is smaller than the concentration of rhenium of the upper core layer 36 at any point more backward than the leading edge 36a of the upper core layer 36.

Without the need for changing the plating solution, the concentration difference of the FeNiX alloy forming the upper core layer 36 between the concentration of iron by weight percent and the concentration of the element X by weight percent is varied within the upper core layer 36. The upper core layer 36 is manufactured as a single layer structure, and is free from a disturbance in the flow of magnetic flux, which is experienced in the known upper core layer formed of a plurality magnetic layers of different magnetic materials.

Figure 14:
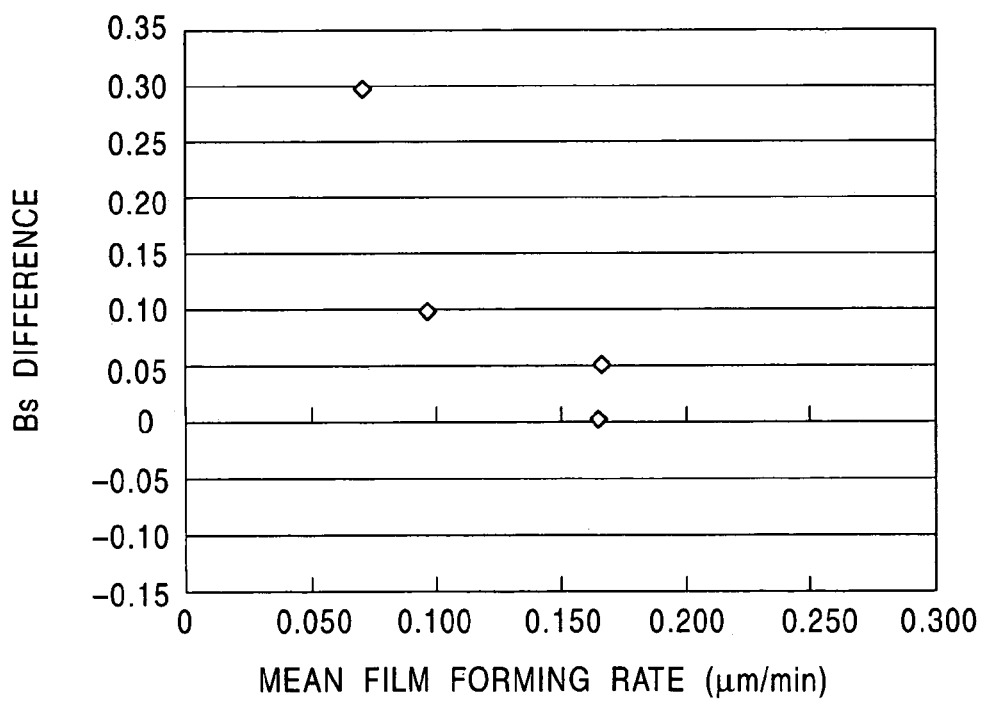
FIG. 14 is a graph plotting the relationship of a film forming rate of the upper core layer and the difference between the saturation magnetic flux density at the leading edge and the saturation magnetic flux density at the apex of the upper core layer of the magnetic head in accordance with the preferred embodiments of the present invention.
Figure 15:
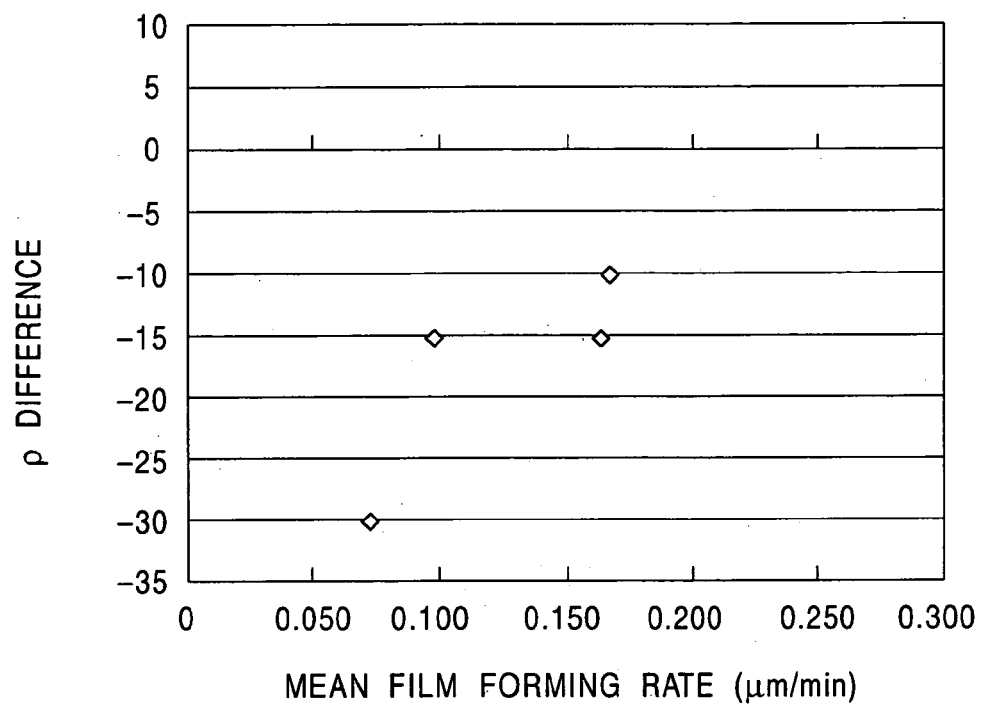
FIG. 15 is a graph plotting the relationship of a film forming rate of the upper core layer and the difference between a specific resistance at the leading edge and a specific resistance at the apex of the upper core layer of the magnetic head in accordance with the preferred embodiments of the present invention.

FIG. 14 is a graph plotting the mean film forming rate of the upper core layer 36 and the difference between the saturation magnetic flux density Bs at the leading edge 36a and the saturation magnetic flux density Bs at the apex 36d. FIG. 15 is a graph plotting the mean film forming rate of the upper core layer 36 and the difference between the specific resistance ρ at the leading edge 36a and the specific resistance ρ at the apex 36d.

As shown in FIG. 14, the difference between the saturation magnetic flux density Bs at the leading edge 36a and the saturation magnetic flux density Bs at the apex 36d is 0.3 (T) at maximum with the mean film forming rate of the upper core layer 36 at 0.071 μm/minute. If the mean film forming rate is heightened, the difference between the saturation magnetic flux density Bs at the leading edge 36a and the saturation magnetic flux density Bs at the apex 36d is reduced. The difference of saturation magnetic flux density Bs becomes zero (T) with the mean film forming rate at 0.163 μm/minute.

As shown in FIG. 15, the difference between the specific resistance ρ at the leading edge. 36a and the specific resistance ρ at the apex 36d is maximized at −30 (μΩ·cm) with the mean film forming rate of the upper core layer 36 at 0.071 μm/minute. If the mean film forming rate is heightened, the specific resistance difference is decreased. The difference between the specific resistance ρ at the leading edge 36a and the specific resistance ρ at the apex 36d is −10 (μΩ·cm) with the mean film forming rate at 0.168 μm/minute.

A magnetic head having a large saturation magnetic flux density Bs at the leading edge 36a of the upper core layer 36 and having a large specific resistance ρ at the apex 36d is achieved by decreasing the mean film forming rate during the plating process of the upper core layer 36.

As already discussed, the film forming rate is low at the rear section C having a high rhenium concentration and high at the front section A having a low rhenium concentration. The thickness t3 at the apex 36d of the upper core layer 36 is smaller than the thickness t4 at the leading edge 36a of the upper core layer 36.

Figure 16:
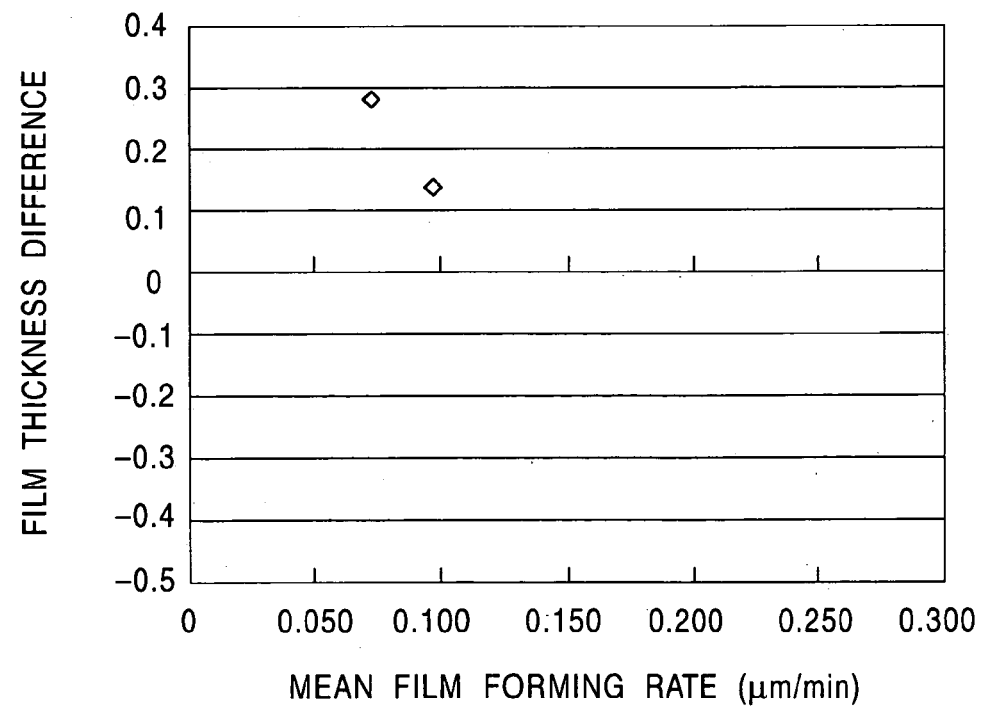
FIG. 16 is a graph plotting the relationship of a film forming rate of the upper core layer and the difference between the film thickness at the leading edge and the film thickness at the apex of the upper core layer of the magnetic head in accordance with the preferred embodiments of the present invention.

FIG. 16 is a graph plotting the relationship between the mean film forming rate of the upper core layer 36 and the thickness difference between the thickness of the upper core layer 36 at the leading edge 36a and the thickness of the upper core layer 36 at the apex 36d.

The thickness difference between the thickness at the leading edge 36a and the thickness at the apex 36d is 0.28 μm with the mean film forming rate of the upper core layer 36 at 0.071 μm/minute. The thickness difference between the thickness at the leading edge 36a and the thickness at the apex 36d is as small as 0.14 μm with the mean film forming rate of the upper core layer 36 at 0.097 μm/minute, but the thickness at the leading edge 36a is still larger than the thickness at the apex 36d.

More specifically, resistance is increased by thinning a portion of the upper core layer 36 spaced away from the leading edge 36a to reduce the eddy current loss. The thickness of the upper core layer 36 at and in the vicinity of the leading edge 36a, greatly affecting the recording characteristics, is not reduced.

In the above example, the upper core layer 36 is made of the FeNiRe alloy. The same results are achieved by fabricating the upper core layer 36 of an FeNiMo alloy.

Table 2 lists the concentrations of the elements of the FeNiMo alloy that forms the upper core layer 36.

TABLE 2

| FeNiMo | |
|---|---|
| Fe ion concent. (g/l) | 1.3 |
| Ni ion concent. (g/l) | 10 |
| Fe/Ni ion concent. ratio | 0.13 |
| Mo ion concent. (g/l) | 0.04 |
| Boric acid concent. (g/l) | 25 |
| NaCl concent. (g/l) | 25 |
| Sodium saccharate concent. (g/l) | 2.0 |
| Actual current density (mA/cm$^2$) | 17 |
| Duty factor of pulse current | 0.3 |

In this test, a plating bath was set within a temperature range of 25 to 30° C., and the pH level of the plating bath was set to be within a range of 3.0 to 4.0. A nickel electrode was used for the anode electrode in the plating process.

In this example, the FeNiMo alloy was electroplated using a pulse current. The pulse current had an ON/OFF duty factor of 300/700 ms.

Table 3 lists the difference between the concentration of iron by weight percent at the leading edge 36a and the concentration of iron by weight percent at the apex 36d, the difference between the concentration of molybdenum by weight percent at the leading edge 36a and the concentration of molybdenum by weight percent at the apex 36d, and the difference between the saturation magnetic flux density Bs at the leading edge 36a and the saturation magnetic flux density Bs at the apex 36d of the obtained magnetic head. Table 3 also lists the difference between the specific resistance ρ at the leading edge 36a and the specific resistance ρ at the apex 36d, and the difference between the thickness of the upper core layer 36 at the leading edge 36a and the thickness of the upper core layer 36 at the apex 36d of the obtained magnetic head.

TABLE 3

| | Leading edge | Apex | Leading edge − Apex |
|---|---|---|---|
| Fe concent. (weight percent) | 57.5 | 56.5 | 1.0 |
| Ni concent. (weight percent) | 36.7 | 34.1 | 2.6 |
| Mo concent. (weight percent) | 5.9 | 9.4 | −3.5 |
| Bs (T) | 1.4 | 1.2 | 0.2 |
| ρ (μΩ · cm) | 70 | 90 | −20 |
| Film thickness (μm) | 1.7 | 1.6 | 0.1 |

The concentration of iron by weight percent at the leading edge 36a is larger than the concentration of iron by weight percent at the apex 36d. The concentration of molybdenum by weight percent at the leading edge 36a is smaller than the concentration of molybdenum by weight percent at the apex 36d. As a result, the saturation magnetic flux density Bs at the leading edge 36a is larger than the saturation magnetic flux density Bs at the apex 36d, and the specific resistance ρ at the leading edge 36a is smaller than the specific resistance ρ at the apex 36d.

The thickness of the upper core layer 36 at the leading edge 36a is larger than the thickness of the upper core layer 36 at the apex 36d.

The magnetic head including the upper core layer 36 made of the FeNiMo alloy provides the same advantages as the magnetic head including the upper core layer 36 made of the FeNiRe alloy.

The concentrations of iron and rhenium of the FeNiRe alloy in the upper core layer 36 were measured from the lower surface 36e to the upper surface 36f along the leading edge 36a or the apex 36d.

Table 4 lists the concentrations of the elements of the plating of the upper core layer 36 in this example.

TABLE 4

Figure 17:
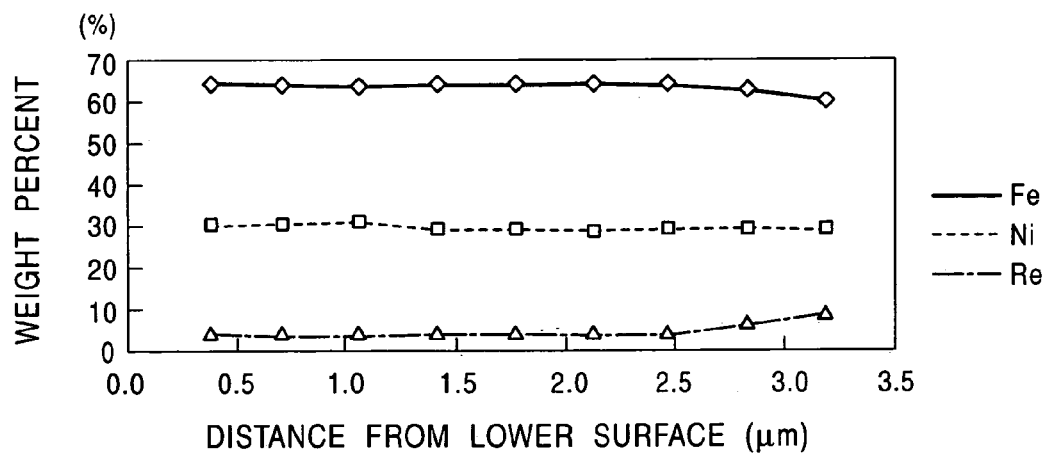
FIG. 17 is a graph plotting variations in the concentrations of the elements along the direction of thickness of the upper core layer of the magnetic head at the apex thereof in accordance with the preferred embodiments of the present invention.
Figure 18:
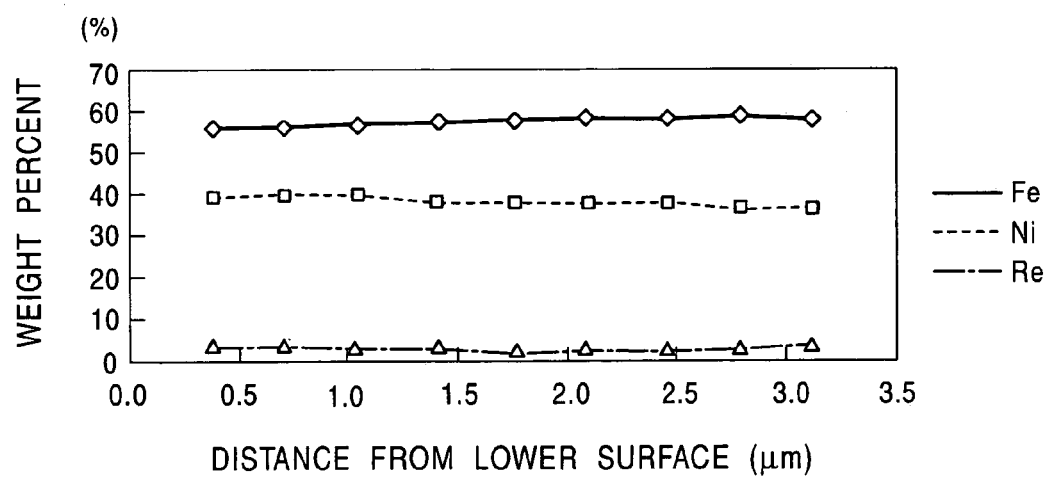
FIG. 18 is a graph plotting variations in the concentrations of the elements in the direction of thickness of the upper core layer of the magnetic head at the leading edge thereof in accordance with the preferred embodiments of the present invention.
Figure 19:
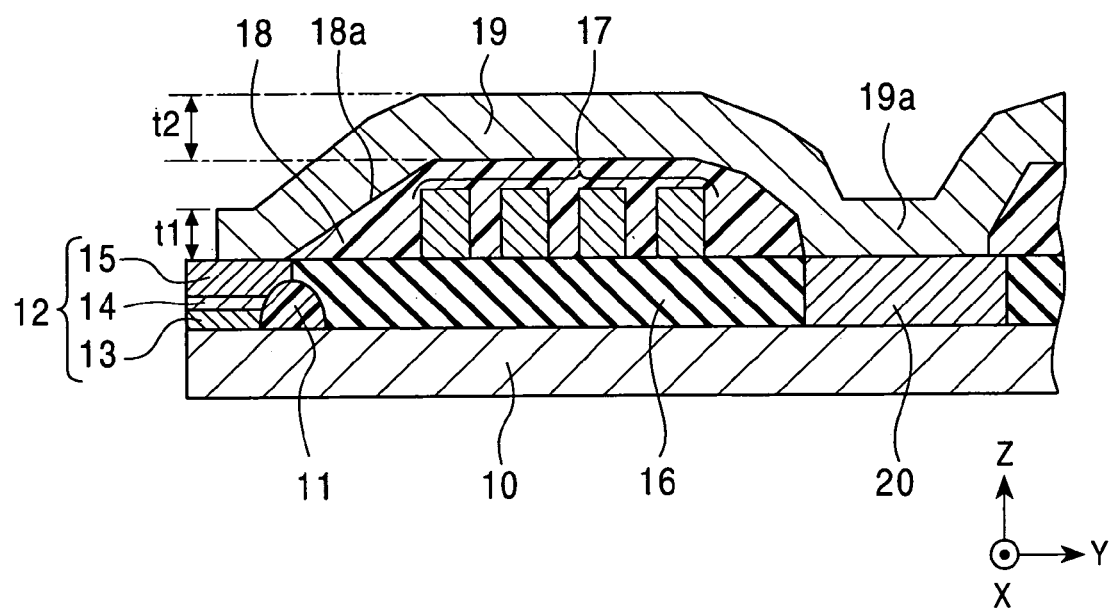
FIG. 19 is a sectional view of a known magnetic head.

| NiFeRe | FIGS. 17 and 18 |
|---|---|
| Fe ion concent. (g/l) | 1.2 |
| Ni ion concent. (g/l) | 10 |
| Fe ion concent. (g/l) | 0.12 |
| Re ion concent. (g/l) | 0.05 |
| Boric acid concent. (g/l) | 25 |
| NaCl concent. (g/l) | 25 |
| Sodium saccharate (g/l) | 2.0 |
| Actual current density (mA/cm$^2$) | 25 |

In this test, a plating bath was set within a temperature range of 25 to 30° C., and the pH level of the plating bath was set to be within a range of 3.0 to 4.0. A nickel electrode was used for the anode electrode in the plating process. The plating process was performed using a pulse current having an ON/OFF duty factor of 300/700 ms.

FIG. 17 lists the concentrations of the elements of the FeNiRe alloy from the lower surface 36e to the upper surface 36f at the apex 36d of the upper core layer 36.

FIG. 17 lists the concentrations of the elements of the FeNiRe alloy from the lower surface 36e to the upper surface 36f at the leading edge 36a of the upper core layer 36. Specimens were taken at the center line across the track width of the upper core layer 36 (as represented by the dot-and-dash chain line in FIG. 1).

As shown in FIGS. 17 and 18, the concentration of rhenium by weight percent of the FeNiRe alloy continuously rises with the distance from the lower surface 36e to the upper surface 36f. The variation in the concentration of iron by weight percent from the lower surface 36e to the upper surface 36f is not significant.

More specifically, the concentration difference (the concentration of iron by weight percent minus the concentration of rhenium by weigh percent) is smaller at the upper surface 36f than at the lower surface 36e.

If the concentration difference of the FeNiRe alloy between the concentration of iron by weight percent and the concentration of rhenium by weigh percent increases, the concentration ratio of iron to the other elements becomes higher, and the saturation magnetic flux density Bs increases. If the concentration difference of the FeNiRe alloy between the concentration of iron by weight percent and the concentration of rhenium by weigh percent decreases, the concentration ratio of rhenium to the other elements becomes higher. The specific resistance ρ increases and the saturation magnetic flux density Bs decreases.

The concentration ratio of iron of the FeNiRe alloy to the other elements at the lower surface 36e increases, thereby heightening the saturation magnetic flux density Bs. The concentration ratio of rhenium of the FeNiRe alloy to the other elements at the upper surface 36f increases, thereby increasing the specific resistance ρ and decreasing the saturation magnetic flux density Bs.

More specifically, the saturation magnetic flux density Bs becomes high at the lower surface 36e of the upper core layer 36 closer to the coil layer 38, namely, in a portion of the shortest magnetic path in the upper core layer 36 of the magnetic head. The overwrite characteristics of the magnetic head are improved. The magnetic head accommodates a frequency shift of a recording signal to a higher range by increasing the specific resistance ρ on and in the vicinity of the upper surface 36f of the upper core layer 36.

Even if the upper core layer 36 has a single layer structure, the concentration difference of the FeNiX alloy between the concentration of iron by weight percent and the concentration of rhenium by weight percent of the upper core layer 36 made of the FeNiX alloy is varied within the upper core layer 36. The upper core layer 36 is free from a disturbance in the flow of magnetic flux, which is experienced in the known upper core layer formed of a plurality magnetic layers of different magnetic materials.

When the upper core layer 36 is made of the FeNiMo alloy, the concentration difference of the FeNiMo alloy between the concentration of iron by weight percent and the concentration of molybdenum by weight percent of the upper core layer 36 is set to be smaller on the upper surface 36f than on the lower surface 36e.

The embodiments of the present invention have been discussed. A variety of modifications and changes may be implemented without departing from the scope of the present invention.

The embodiments of the present invention have been discussed for exemplary purposes only, and are not intended to limit the scope of the present invention.

What is claimed is:

1. A magnetic head comprising a lower core layer, an upper core layer, a non-magnetic gap layer positioned between the lower core layer and the upper core layer, and a coil layer, provided surrounding a magnetic coupling portion between the lower core layer and the upper core layer, for applying a magnetic field to the lower core layer and the upper core layer,
wherein the upper core layer, made of an FeNiX alloy (X being an element of one of rhenium Re and molybdenum Mo), and defined by a lower surface facing the lower core layer and an upper surface opposed to the lower surface, comprises a rising portion that gradually rises from a side opposing a recording medium toward a deeper side of the head with the lower surface and the upper surface gradually parting away from the lower core layer, and a core leading portion where the lower surface and the upper surface extend in parallel with the lower core layer, and
wherein a concentration difference of the upper core layer between a concentration of iron by weight percent and a concentration of the element X by weight percent is smaller at any backward position at a thickness center than at any frontward position, located more frontward than the backward position, at the thickness center in each of the leading portion and the rising portion where the thickness center lies at a half-thickness level of the thickness of the upper core layer between the upper surface and the lower surface thereof, the thickness being along a direction of line normal to the lower surface.

2. A magnetic head according to claim 1, wherein the frontward position is at a leading edge opposing the recording medium, and the backward position is at an apex where the upper surface is spaced farthest apart from the lower core layer.

3. A magnetic head according to claim 1, wherein the concentration difference is gradually varied from the frontward position to the backward position along a center line that extends at the thickness center of the upper core layer from the opposing side to the deeper side.

4. A magnetic head according to claim 1, wherein the concentration of iron by weight percent of the upper core layer is smaller at the backward position at the thickness center than at any frontward position at the thickness center in each of the core leading portion and the rising portion.

5. A magnetic head according to claim 4, wherein the concentration of iron by weight percent of the upper core layer is gradually varied from the frontward position to the backward position along a center line that extends at the thickness center of the upper core layer from the opposing side to the deeper side.

6. A magnetic head according to claim 1, wherein the concentration of the element X by weight percent of the upper core layer is larger at the backward position at the thickness center than at any frontward position at the thickness center in each of the core leading portion and the rising portion.

7. A magnetic head according to claim 6, wherein the concentration of the element X by weight percent of the upper core layer is gradually varied from the frontward position to the backward position along a center line that extends at the thickness center of the upper core layer from the opposing side to the deeper side.

8. A magnetic head according to claim 1, wherein a saturation magnetic flux density of the upper core layer is smaller at the backward position at the thickness center than at any frontward position at the thickness center in each of the core leading portion and the rising portion.

9. A magnetic head according to claim 1, wherein a specific resistance of the upper core layer is larger at the backward position at the thickness center than at any frontward position at the thickness center in each of the core leading portion and the rising portion.

10. A magnetic head according to claim 1,
wherein a concentration difference of the upper core layer between a concentration of iron by weight percent and a concentration of the element X by weight percent is smaller at an upper position than at a lower position where the lower position is any point in one of the core leading portion and the rising portion and the upper position is any point that is closer to the upper surface than the lower position in the one of the core leading portion and the rising portion.

11. A magnetic head according to claim 10, wherein the lower position lies in the lower surface of the upper core layer, and the upper position lies in the upper surface of the upper core layer.

12. A magnetic head according to claim 10, wherein the concentration difference is gradually varied from the lower position to the upper position in one of the core leading portion and the rising portion.

13. A magnetic head according to claim 1, wherein the thickness of the upper core layer at an apex where the upper surface is spaced farthest apart from the lower core layer is smaller than the thickness of the upper core layer at a leading edge of the upper core layer opposing the recording medium.

14. A magnetic head according to claim 1, further comprising a magnetic pole layer at least one of regions between the lower surface of the upper core layer and the non-magnetic gap layer and between the non-magnetic gap layer and the lower core layer, wherein the magnetic pole layer is narrower in a width dimension than the upper core layer.

15. A magnetic head according to claim 10, wherein a thickness of the upper core layer at an apex where the upper surface is spaced farthest apart from the lower core layer is smaller than a thickness of the upper core layer at a leading edge of the upper core layer opposing the recording medium.

16. A magnetic head according to claim 10, further comprising a magnetic pole layer at least one of regions between the lower surface of the upper core layer and the non-magnetic gap layer and between the non-magnetic gap layer and the lower core layer, wherein the magnetic pole layer is narrower in a width dimension than the upper core layer.

* * * * *